United States Patent
Karve et al.

(10) Patent No.: US 10,284,433 B2
(45) Date of Patent: May 7, 2019

(54) DATA SYNCHRONIZATION USING REDUNDANCY DETECTION

(71) Applicant: International Business Machines Corporation, Armonk, NY (US)

(72) Inventors: Alexei A. Karve, Mohegan Lake, NY (US); Andrzej Kochut, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/750,963

(22) Filed: Jun. 25, 2015

(65) Prior Publication Data

US 2016/0380840 A1     Dec. 29, 2016

(51) Int. Cl.
*G06F 15/173*     (2006.01)
*H04L 12/24*     (2006.01)
*H04L 29/08*     (2006.01)

(52) U.S. Cl.
CPC .............. *H04L 41/20* (2013.01); *H04L 67/02* (2013.01); *H04L 67/06* (2013.01); *H04L 67/1095* (2013.01); *H04L 67/1097* (2013.01)

(58) Field of Classification Search
CPC ..... H04L 12/1854; H04L 41/20; H04L 43/16; H04L 67/1091; H04L 67/1097; H04L 51/22; G06F 17/30017; G06F 17/30203; G06F 9/45533; G06F 9/45558; G06F 17/30067; G06F 17/30575; G06F 9/5077
See application file for complete search history.

(56) References Cited

U.S. PATENT DOCUMENTS

| | | | |
|---|---|---|---|
| 6,789,156 B1 | 9/2004 | Waldspurger | |
| 7,433,869 B2 | 10/2008 | Gollapudi | |
| 7,685,185 B2 | 3/2010 | Ramasubramanian et al. | |
| 7,761,664 B2 | 7/2010 | Gill | |
| 7,856,439 B2 | 12/2010 | Alpern et al. | |
| 8,074,047 B2 | 12/2011 | Abali et al. | |
| 8,239,609 B2 | 8/2012 | Hudzia et al. | |
| 8,897,573 B2 | 11/2014 | Chen et al. | |
| 8,904,113 B2 | 12/2014 | Chen et al. | |
| 9,495,188 B1* | 11/2016 | Ettema | G06F 9/45533 |
| 9,910,906 B2* | 3/2018 | Karve | G06F 17/30575 |
| 2005/0021817 A1* | 1/2005 | Shimizu | H04L 12/1854 709/231 |
| 2005/0223033 A1* | 10/2005 | Kaneko | G06F 17/30017 |
| 2008/0307188 A1 | 12/2008 | Franaszek et al. | |
| 2009/0319585 A1 | 12/2009 | Gokhale | |

(Continued)

OTHER PUBLICATIONS

"Basic Tar Format", http://www.gnu.org/software/tar/manual/html_node/Standard.html, accessed Oct. 20, 2014, p. 1-8.

(Continued)

*Primary Examiner* — Dustin Nguyen
(74) *Attorney, Agent, or Firm* — Erik K. Johnson

(57) ABSTRACT

Managing data in a cloud computing environment, including data transfers. File level and block level similarities are identified, including for archive and nested archive files, residing on datacenters and regional repositories. A replication plan is generated based on receiving a replication instruction, and further based on similarity clusters by transferring unique data blocks and files from best available sources including regional repositories.

14 Claims, 17 Drawing Sheets

(56) References Cited

U.S. PATENT DOCUMENTS

| | | | |
|---|---|---|---|
| 2010/0088349 A1 | 4/2010 | Parab | |
| 2010/0131480 A1 | 5/2010 | Schneider | |
| 2010/0262586 A1* | 10/2010 | Rosikiewicz | G06F 17/30067 707/679 |
| 2010/0312805 A1 | 12/2010 | Noonan, III | |
| 2011/0040732 A1 | 2/2011 | Anglin et al. | |
| 2011/0047133 A1 | 2/2011 | Alpern et al. | |
| 2011/0219372 A1 | 9/2011 | Agrawal et al. | |
| 2012/0005308 A1 | 1/2012 | Cok | |
| 2012/0047223 A1 | 2/2012 | Tarkoma | |
| 2012/0066677 A1 | 3/2012 | Tang | |
| 2012/0084445 A1* | 4/2012 | Brock | G06F 9/5077 709/226 |
| 2012/0144099 A1 | 6/2012 | Yang et al. | |
| 2012/0173656 A1 | 7/2012 | Sorenson, III | |
| 2012/0192175 A1* | 7/2012 | Dorai | G06F 9/45558 718/1 |
| 2012/0303618 A1* | 11/2012 | Dutta | H04L 67/1097 707/737 |
| 2013/0004089 A1 | 1/2013 | Head et al. | |
| 2013/0018854 A1 | 1/2013 | Condict | |
| 2013/0103708 A1* | 4/2013 | Kim | G06F 17/30203 707/758 |
| 2013/0290542 A1* | 10/2013 | Watt | H04L 51/22 709/226 |
| 2014/0025723 A1* | 1/2014 | Xu | H04L 67/1091 709/203 |
| 2014/0025796 A1* | 1/2014 | Vibhor | H04L 41/20 709/222 |
| 2014/0040893 A1 | 2/2014 | Karve et al. | |
| 2014/0050407 A1 | 2/2014 | Chen et al. | |
| 2014/0052698 A1 | 2/2014 | Chen et al. | |
| 2014/0149591 A1* | 5/2014 | Bhattacharya | H04L 67/1097 709/226 |
| 2014/0207736 A1* | 7/2014 | Susanto | G06F 17/30575 707/634 |
| 2014/0222953 A1 | 8/2014 | Karve et al. | |
| 2015/0350262 A1* | 12/2015 | Rainisto | H04L 43/16 709/204 |
| 2016/0292578 A1 | 10/2016 | Ashenfelter | |

OTHER PUBLICATIONS

Tridgell et al., "The RSYNC Algorithm", http://rsync.samba.org/tech_report/, printed on Oct. 20, 2014, p. 1.

Copy-on-Write, Wikipedia, http://en.wikipedia.org/wiki/Copy-on-write, printed on Jun. 5, 2015, pp. 1-3.

Mell et al., "The NIST Definition of Cloud Computing", National Institue of Standards and Technology, Special Publication 800-145, Sep. 2011, pp. 1-7.

Jayaram et al., "An Empirical Analysis of Similarity in Virtual Machine Images", Middleware 2011 Industry Track, Dec. 12, 2011, Lisbon, Portugal, pp. 1-6.

Ammons et al., "Virtual Machine Images as Structured Data: The Mirage Image Library", IBM Research, pp. 1-6.

Shen et al., "VMAR: Optimizing I/O Performance and Resource Utilization in the Cloud", IFIP International Federation for Information Processing 2013, pp. 183-203.

Karve et al., "Image Transfer Optimization for Agile Development", 2013 IFIP, pp. 554-560.

Karve et al., "Redundancy Aware Virtual Disk Mobility for Cloud Computing", 2013 IEEE Sixth International Conference on Cloud Computing, p. 35-42.

Kochut et al., "Leveraging Local Image Redundancy for Efficient Virtual Machine Provisioning", 2012 IEEE, pp. 179-187.

Kochut et al., "Evaluation of Redundancy Driven Provisioning for Hypervisors with Locally Attached Storage", 19th Annual IEEE International Symposium on Modelling, Analysis, and Simulation of Computer and Telecommunication Systems, 2011 IEEE, pp. 441-443.

Zhang et al., "Small is Big: Functionally Partitioned File Caching in Virtualized Environments", IBM T.J. Watson Research Center, pp. 1-6.

Peng et al., "VDN: Virtual Machine Image Distribution Network for Cloud Data Centers", 2012 Proceedings IEEE INFOCOM, pp. 181-189.

http://www.openoffice.org/download/checksums.html, New: Apache OpenOffice 4.1.1 released!, printed on Apr. 20, 2015, pp. 1-6.

http://www.01.ibm.com/support/knowledgecenter/api/content/nl/en-us/ . . . , "Checksum Values for eAssemblies", printed on Apr. 20, 2015, pp. 1-7.

http://www.eclipse.org/modeling/downloads/verifyMD5.php, "Eclipse Modeling-Verifying Downloads With MD5 Checksum", printed on Apr. 20, 2015, p. 1.

http://01.ibm.com/support/docreview.wss?uid=swg21496703, "How to Get the MD5 Checksum for a file: md5sum, digest, csum, fciv",printed on Apr. 20, 2015, pp. 1-3.

http://w3.research.ibm.com/mirage, Welcome to the Mirage Project, "Virtual Machine Images as Structured Data: The Mirage Project", printed on Apr. 20, 2015, pp. 1-5.

Jafari et al., "Maximizing Download Bandwidth for File Sharing in BitTorrent-like Peer-to-Peer Networks", 2008 14th IEEE International Conference on Parallel and Distributed Systems, pp. 344-350.

Wood et al., "CloudNet: A Platform for Optimized WAN Migration of Virtual Machines", University of Massachusetts, Technical Report 2010-002, pp. 1-14.

Harks, "Utility Proportional Fair Bandwidth Allocation: An Optimization Oriented Approach", LNCS 3375, pp. 61-74, 2005.

Sapuntzakis et al., "Optimizing the Migration of Virtual Computers", 5th Symposium on Operating Systems Design and Implementation, SIGOPS Operating Systems Review, vol. 36, Issue SI, Dec. 2002, pp. 377-390.

* cited by examiner

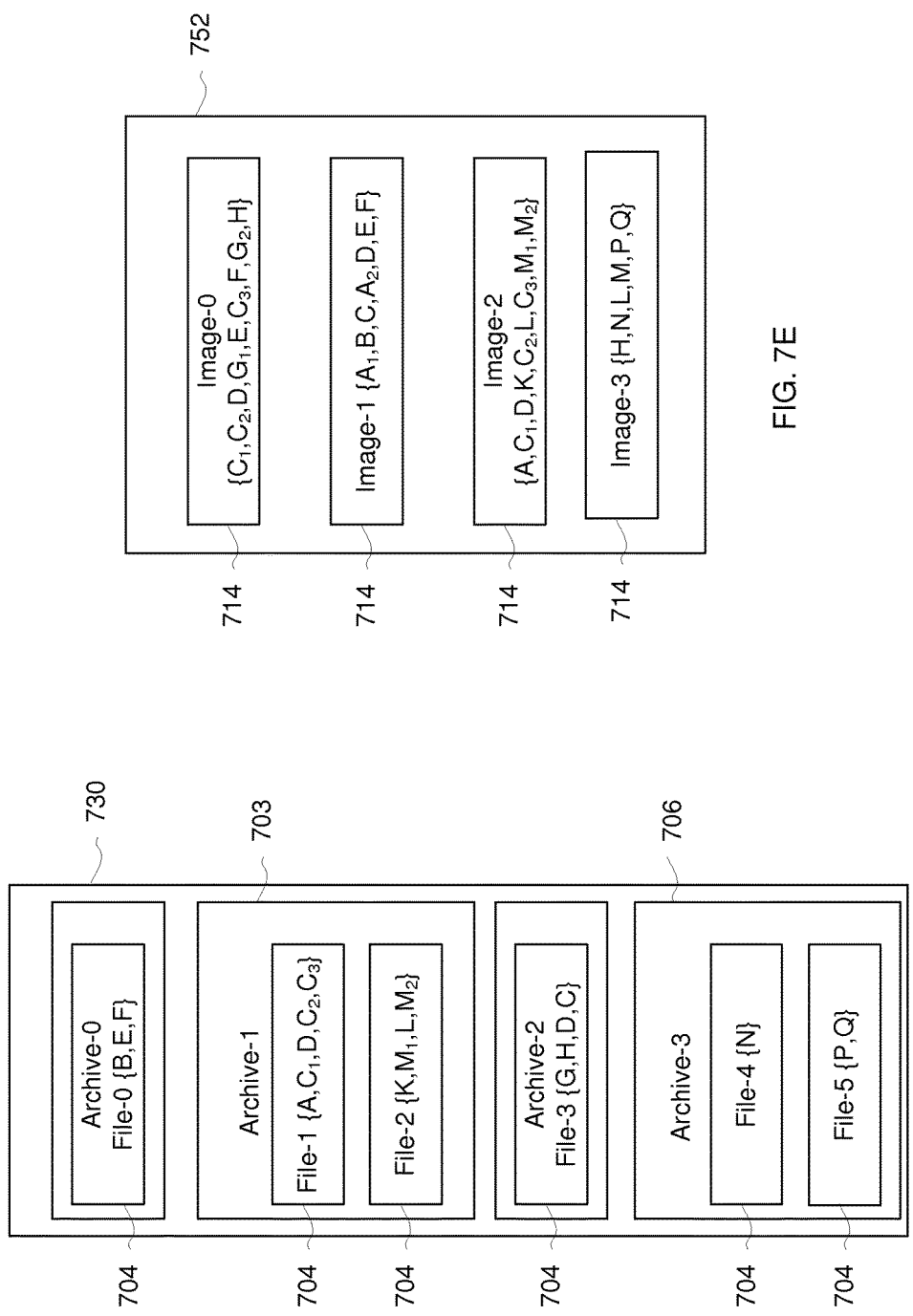

DATA SYNCHRONIZATION USING REDUNDANCY DETECTION

BACKGROUND

Embodiments of the invention generally relate to cloud computing, and more particularly, to transferring data between nodes in a distributed computing environment.

Cloud computing is an information technology (IT) delivery model that is expected to grow significantly in at least the next decade. It allows specialized providers in the IT industry to offer their customers various types of services, ranging from Infrastructure-as-a-Service (IaaS), which offers remote access to computing resources such as virtual machines (VMs), and storage, to Software-as-a-Service (SaaS), which offers fully managed software functionality. These types of services allow labor, hardware, software and system management costs to be shared; they reduce overall costs and make such services more affordable for both individual and enterprise consumers. Cloud computing also allows a new generation of IT services to develop, which can be more easily integrated and delivered. More specifically, it significantly builds on the potential for both virtualization technology and broad scale automation to minimize delivery costs while maintaining a high quality of service.

Large cloud computing service providers, and IaaS providers in particular, tend to deliver their services out of multiple worldwide datacenters. Consequently, substantial collections of data must be made available on more than one datacenter, and therefore may need to be transferred between datacenters across the cloud architecture.

Examples of data that may require transferring between datacenters include, without limitation: virtual machine (VM) images; packages; and archives.

SUMMARY

Embodiments of the invention provide for a method, system, and computer program product for managing data on a set of servers. Embodiments of the invention identify one or more attributes of the set of servers, and further identify shared attributes of the set of servers based on the identified attributes. Embodiments of the invention assign the plurality of servers to one or more server groups based on corresponding shared attributes of the plurality of servers, whereby each grouping of a set of servers among the plurality of servers defines a region.

Embodiments of the invention may assign one or more of the following attributes: a geographical region; a geographical proximity relative to one or more servers; a cost factor; an accessibility factor; and server bandwidth.

In some embodiments, the set of servers may include one or more of a file transfer protocol (FTP) server, a hyper text transfer protocol (HTTP) server, and a datacenter.

In some embodiments, data stored on the set of servers may include a software package. In some embodiments, the software package is in archived format. In some embodiments, data blocks of the software package are distributed among at least two of the set of servers, where none of the plurality of servers store all data blocks of the software package.

Embodiments of the invention may receive an instruction to replicate a designated data set having data blocks stored on one or more of the plurality of servers on a target server. Embodiments of the invention may identify first, second, and third subsets of data blocks in the designated data set where (i) the first subset includes data blocks stored on only one server in the plurality of servers other than the target server; (ii) the second subset includes data blocks stored on at least the target server; and (iii) the third subset includes data blocks stored on at least two servers other than the target server. Embodiments of the invention may generate a data replication plan for replicating the designated data set based on identifying the first, second, and third subsets of the set of similarity clusters, and replicate the designated data on the target server according to the data replication plan.

Embodiments of the invention may generate the data replication plan by selecting a source server from which to transfer some or all data blocks of the designated data set, where the selecting includes selecting as the source server: for the first subset, the only one server; for the second subset, a server other than the target server; and for the third subset, the at least two servers other than the target server.

Embodiments of the invention may receive an instruction to replicate a designated data set having data blocks stored on one or more of the set of servers on a target server, and select one of the one or more servers as a source server, where the selecting is based on one or more of: the source server belonging to a same region as the target server; the source server belonging to a region having a defined minimum bandwidth available; the source server being a datacenter; and the source server having a trust factor meeting a threshold value, wherein the trust factor.

BRIEF DESCRIPTION OF THE SEVERAL VIEWS OF THE DRAWINGS

FIG. 7D is a block diagram depicting metadata associated with archived and non-archives files hosted on datacenters and regional repositories, according to an embodiment of the invention.

FIG. 7E is a block diagram depicting metadata associated with virtual machine images on datacenters and regional repositories, according to an embodiment of the invention.

DETAILED DESCRIPTION

There are many scenarios under which such data may require transferring from one datacenter to another. For example, VM images may need to be transferred between datacenters in a public cloud where a service provider offers a new or updated catalog of base images; or where a client determines that a particular captured or snapshot image is needed for high availability. As a further example, VM images may require transferring where VM images are to be hosted on a different cloud and/or hypervisor, such as when a customer decides to change service providers. As yet a further example, software developers may use a different datacenter, or a different cloud, for each of the development/testing, staging, and production phases of a DevOps process, and may therefore need VM images transferred from one datacenter/cloud to another. As a further example, VM images may require transferring between a customer's systems on a private cloud (for backup storage, or extended functionality) to a public cloud, in a hybrid cloud environment.

Crude or inefficient transfer methods, such as simply transferring all of the data designated for migration (including all constituent data blocks), require a lot of time and bandwidth. Some solutions, for example, allow reusing VM image content that is built from a common parent. Any update to the common parent then applies to all child content and may require a corresponding update. The problem is exacerbated where users have their own base images in private repositories, where the layers in independently created branches become large and do not take into account any commonality across branches, thus requiring transfers of large layers. As cloud computing environments and the size of such data grow to meet demand, the efficient and optimal transfer of such data across the cloud becomes critical.

An intelligent, efficient, and cost-effective solution for transferring such data across a cloud environment takes advantage of the significant degree of similarity typically seen across such data. This similarity is due, in large part, to the fact that many software packages, such as operating system libraries, configuration settings, and in many cases, user data, are very similar across multiple data sets. It is therefore desirable to employ a solution that takes advantage of these similarities.

Figure 1:
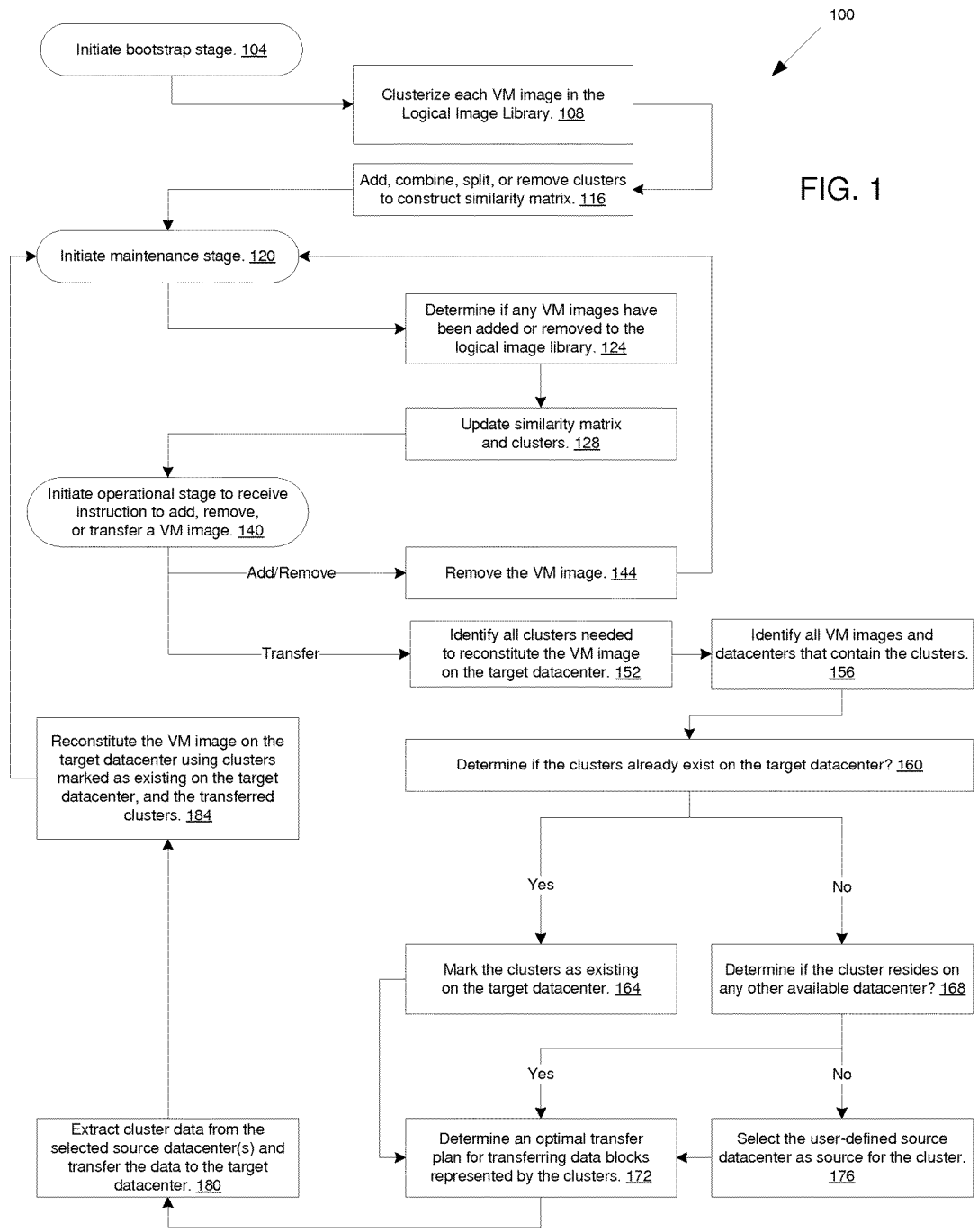
FIG. 1 is a flowchart of a method for managing data on a cloud computing environment, according to an embodiment of the invention.
Figure 2:
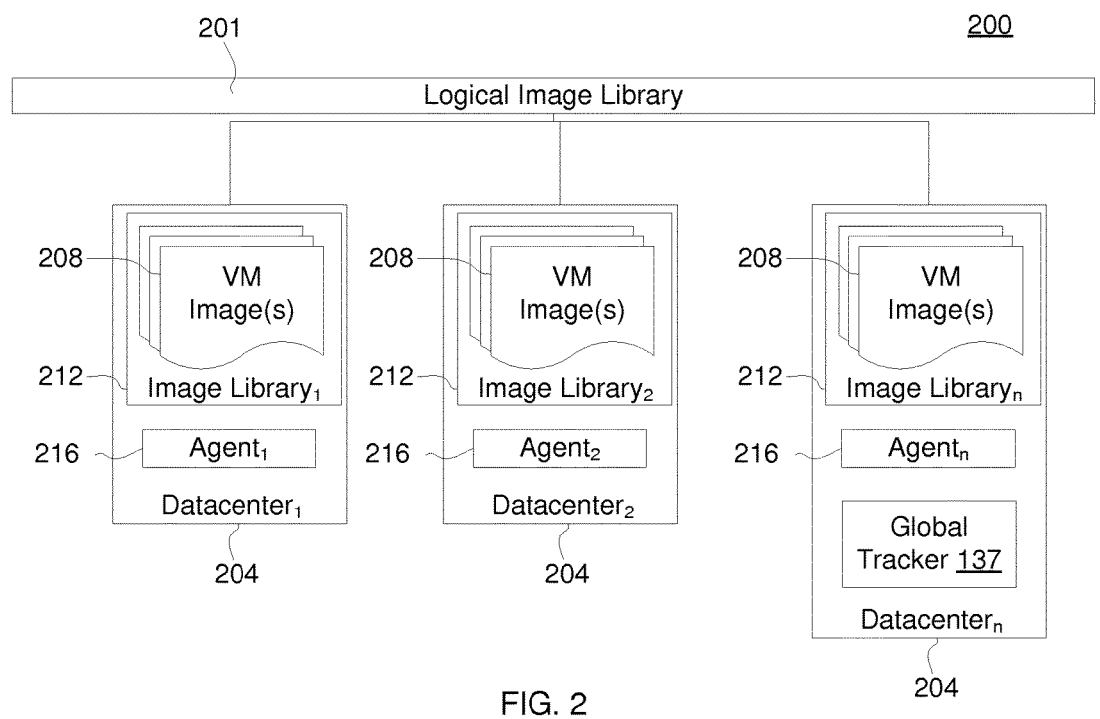
FIG. 2 is a block diagram of a cloud computing environment, according to an embodiment of the invention.

Referring now to FIGS. 1-2, a method 100 according to an embodiment of the invention may be deployed over a cloud computing environment 200 comprising {n} datacenters 204, each datacenter 204 functioning as a node 10 as described in connection with FIG. 11. Furthermore, each datacenter 204 contains a collection of virtual machine images ("VM images") 208 (in additional embodiments of the invention, such data may additionally or alternatively include, archival data, such as tar files). An aim of method 100, according to an embodiment of the invention, is to intelligently and efficiently transfer the VM images 208 between the datacenters 204, when instructed, by: identifying similarities between the VM images 208; determining their availability across the datacenters 204; and devising an optimal plan for their transfer based on a set of factors including cost, speed, and availability. Method 100 accomplishes this aim in three broad stages: a bootstrap stage 104, in which the VM images 208 are tracked and organized to form a Logical Image Library 201; a maintenance stage 120, in which the Logical Image Library 201 is tracked and organized periodically, or after changes have been made, or both; and an operational stage 140, in which VM images are transferred between the datacenters 204, or are otherwise modified.

Method 100 initiates the bootstrap stage 104, whereby method 100 processes the VM images stored on the datacenters 204. Each datacenter 204 comprises a collection of VM images 208 forming a local Image Library 212, an Agent 216 that tracks information about the local Image Library 212. The $n^{th}$ datacenter 204 further comprises a Global Tracker 137, which, in addition to tracking information about the VM images stored locally on the $n^{th}$ datacenter, also tracks information about the VM images on all Image Libraries 212, across the datacenters 204, which collectively form the Logical Image Library 201. In an embodiment, Global Tracker 137 may be integrated within $Agent_n$ 216 on $Datacenter_n$ 204.

Figures 4, 5:
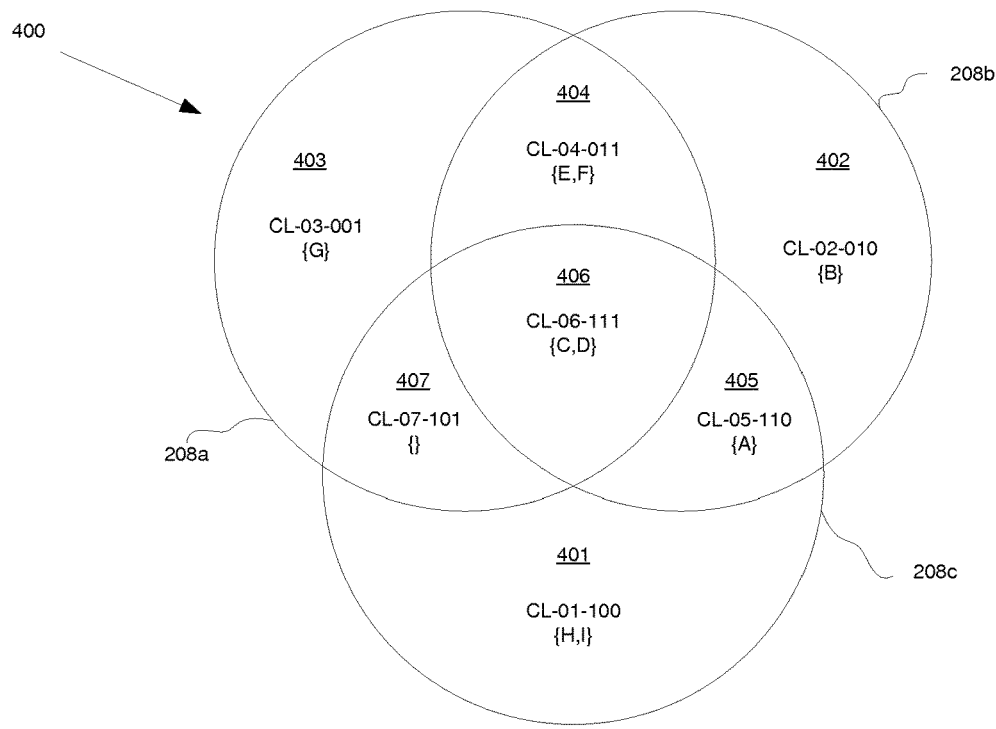
FIG. 4 is a Venn diagram depicting similarities between the groups of metadata in FIG. 3, according to an embodiment of the invention.
FIG. 5 is a similarity matrix based on the metadata of FIGS. 3 and 4, according to an embodiment of the invention.

The processing is performed in step 108, wherein method 100 analyses each VM image 208 across the Logical Image Library 201 to create "clusters". A cluster (an example of which is shown in FIG. 4 through a Venn diagram) may be represented using a cluster identifier, a set of metadata comprising at least a set of calculated hash values associated with data block sets residing on one or more VM images 208, and may further include: an integer representing the total number of blocks within the hash value that are shared amongst the VM images 208 associated with the cluster; a block number array containing the data block numbers within the VM images 208 associated with the hash value; and an array functioning as an index to the block number array. The clusters do not contain the actual data blocks with which they are associated. Each cluster is identified using a binary bitset representation, where the length of the bitset equals the total number of distinct VM images 208 present on the Logical Image Library 201, with each bit representing one of the VM images 208, and set as described below.

According to the disclosed embodiment, analyzing each VM image 208 in step 108, as described above, includes creating a content digest for each processed VM image 208. A content digest is a collection of information about a VM image 208 that contains: a hash code signature for each data block in the VM image 208; the number of data blocks in that VM image that share the hash code (representing the internal redundancy of a data block, i.e. the number of times the same data block appears in the VM image 208); and a list of data block numbers (representing the data block positions within the VM image 208). Information from the content digest is used to create a "singleton cluster", i.e. a cluster that contains the hash codes for all data blocks present in the given VM image 208. Once the singleton cluster is created, it is added to an indexed cluster list, which is tracked by the Global Tracker 137. Furthermore, a Bloom filter is maintained to facilitate an efficient comparison of the hash codes to avoid resource-intensive comparisons except in the case of a false positive determination. The hash code signatures are stored in ascending order to facilitate a binary search in case of false positives.

In step 108, each created singleton cluster is compared to each existing cluster, i.e. each cluster that is already tracked by the Global Tracker 137 (where no existing clusters are present, the singleton cluster is added to the cluster list maintained by the Global Tracker 137). More specifically, if a singleton cluster does not share any data blocks with an exiting cluster, the bitset for the existing cluster is updated to reflect a (0) in the bit corresponding to the VM image 208 represented by the singleton cluster. Conversely, if the singleton cluster shares all its data with the existing cluster, the bitset for the existing cluster is updated with a (1) in the appropriate bit position. If the singleton cluster shares only some of its represented data blocks with the existing cluster, then the existing cluster is split to form two clusters; one for the shared data blocks, and one for the unshared data blocks. A new bitset is assigned to each newly formed cluster.

In step 116, method 100 tracks the buildup and transformations of the clusters, using the Global Tracker 137. Accordingly, method 100 generates and updates a similarity matrix (an example of which is shown in FIG. 5), in step 116, that contains the generated information about how data blocks are shared among the VM images 208, and which of the datacenters 204 they reside on, using a cluster list and an index list. Method 100 further retains lists of identifiers, file paths, size, status, cost, time, and availability information associated with each cluster, VM image 208, and datacenter 204, using the Global Tracker 137.

Figure 3:
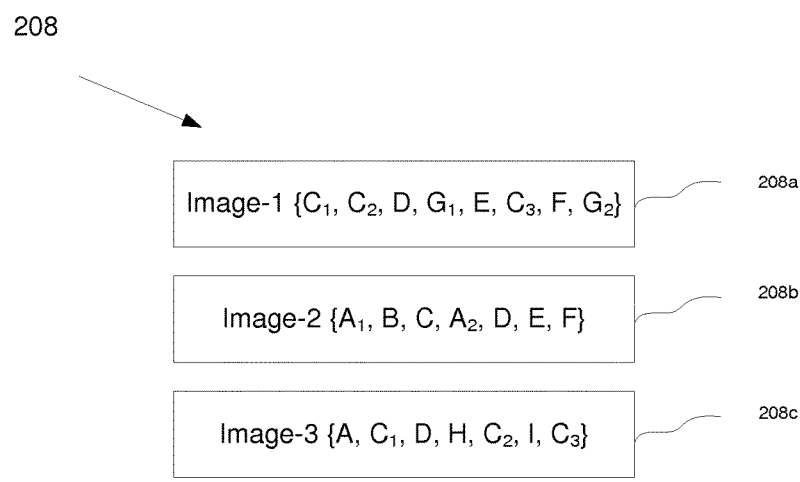
FIG. 3 illustrates an example of metadata associated with a data type (virtual machine images) on the cloud computing environment of FIG. 2, according to an embodiment of the invention.

Referring now to FIG. 3, an example of a collection of three VM images 208, tracked and organized by method 100 in the bootstrap stage 104, may reside as one or more copies on one or more of the datacenters 204. The depicted VM images 208a-c are {Image-1, Image-2, Image-3}, and contain data blocks {A, B, C, D, E, F, G, H, I}. A subscript is appended to data blocks that are stored redundantly in the same VM image 208. For example, data block C appears twice in Image-1, once in Image-2, and thrice in Image-3, and is denoted accordingly by a subscript in each of the depicted VM images 208.

Now referring to FIG. 4, method 100, via step 108, clusterizes the VM images 208a-c shown in FIG. 3. The clusterized VM images 208a-c are shown in an intersection Venn diagram 400. Seven depicted clusters 401-407 ("the clusters") are labeled CL-01 through CL-07 respectively, cluster 407 being empty (i.e., there are no data blocks that are exclusively shared between cluster's 407 constituent VM images), and each is further labeled using a unique bitset. The number of bits in the bitset is equal to the number of VM images 208 in the Logical Image Library 201; in this case, three. Each bit in each of the bitsets {001, 010, 100, 011, 110, 101, 111} represents one of the three VM images 208a-c shown in FIG. 3. According to the present embodiment, the most significant bit of each set represents Image-3 208c, the second most significant bit represents Image-2 208b, and the least significant bit represents Image-1 208a.

According to the depicted embodiment, the hash values used by step 108 to form each cluster are calculated secure hash algorithm 1 codes ("SHA-1 code" or "SHA-1 signature"), and are 20 bytes per 4096-byte sized data blocks in the VM images 208. However, other embodiments may implement other hash functions and other data block sizes (for example, SHA-256, SHA-384, SHA-512, or MD5; 512 bytes, 1 kilobyte, 2 kilobyte, 8 kilobyte data block sizes). Similarly, in an environment where data storage resources are limited or expensive, a shorter hash code may be used to conserve storage space, whereas a longer hash code can reduce hash collisions at the cost of storage space and higher computation cost in an environment where the added cost is not prohibitive. Data block sizes larger than file system block sizes cause internal fragmentation and result in loss of sequentiality of file system blocks reducing the redundancy between images. The selection of a hash code function and data block size, then, may vary and can be influenced by factors such as particular VM image types, file systems, computing environments, and computing resources, without departing from the spirit and scope of the disclosed invention.

Further referring to FIG. 4, in the depicted example, cluster 403 has the bitset 001; it contains the SHA-1 signature and other relevant information corresponding to data block {G}, which is found only on Image-1 208a. Therefore, the least significant bit of the corresponding bitset is (1), and the rest are (0). Similarly, cluster 406 has the bitset 111, because its constituent data blocks, {C, D}, are shared between all three depicted VM images 208a-c. While a VM image 208 may contain multiple copies of a given data block, as for example is the case with data block {C} in Image-1 and Image-3, the internal redundancy increases neither the number of clusters generated nor the number of corresponding hash codes within that cluster (although the cluster may contain additional metadata indicating multiple locations within a given VM image 208 where a particular data block resides).

Now referring to FIGS. 1 and 5, method 100 generates a similarity matrix 500 for the VM images 208 depicted in FIG. 3, which are clusterized in step 108. For illustration purposes, FIG. 5 shows, in part, the similarity matrix 500 in two sections: an upper section 504a corresponding to the singleton clusters 401, 402, and 403, each representing blocks present in only one of the depicted VM images 208a-c; and a lower section 504b corresponding to a set of 3 additional clusters 404, 405, and 406, each representing blocks shared between two or more of the depicted VM images 208a-c. Cluster 407, depicted in FIG. 4, is not included in the similarity matrix 500 because it does not correspond to any data blocks in any image. Similarity matrix may also include the short cluster identifiers to uniquely represent the bitsets 510. Furthermore, in any Logical Image Library 201 with VM images 208 {1-n}, it is preferable to limit the number of clusters tracked and organized using the similarity matrix 500, to the top (n) clusters, even if more clusters are initially generated. Maintaining more than the top (n) clusters in the similarity matrix 500 may become prohibitive. Top (n) clusters are those that represent the most number of shared data blocks, the largest sized shared data blocks, or both. According to another embodiment of the invention, the number of the clusters tracked by method 100 using the similarity matrix 500 is configurable. Such an embodiment can take advantage of particular characteristics of a given cloud computing environment, where additional efficiencies can be found by maintaining additional clusters, or where the added cost of maintaining such additional clusters is not prohibitive. Furthermore, what constitutes a top cluster may also be configurable.

Additionally in step 116, method 100 also tracks cluster size information in blocks of 512 bytes, i.e. the size of data blocks represented by each cluster. In the depicted example, cluster 4, which represents data blocks {E, F}, is 376 MB in size; meaning that transferring cluster 4 from one datacenter 204 to another may require transferring 376 MB of data blocks. This may be performed using standard lossless compression algorithms to further reduce the data transferred.

Method 100 further implements a maintenance stage 120, wherein method 100 detects changes to the Logical Image Library 201 or the datacenters 204, or is initiated by the method's 100 other steps after changes are made. In either instance, method 100 determines those changes in step 124, and updates the similar In the depicted example, each file 704*ity* matrix and its clusters in step 128.

More specifically, changes to the Logical Image Library 201, or the datacenters 204, may occur for many reasons, including, without limitation: user input, such as when a user directs method 100 to transfer or copy a VM image 208 from a source datacenter to a target datacenter, or to remove a VM image 208; or it may include automatic updates that may be required when a datacenter becomes or is suspected of becoming unavailable or difficult to access.

As stated, an aim of method 100 is to facilitate an intelligent and efficient transfer of data blocks from one data center to another. Through the bootstrap stage 104 and the maintenance stage 120, method 100 creates and maintains the information that facilitates reaching this aim. Method 100 is therefore equipped to accept instructions to modify the Logical Image Library 201 in step 140, by adding, removing, or transferring (or a combination thereof) a VM image 208.

When method 100 is instructed to add or remove a VM image from a datacenter 204 in step 140, method 100 processes the instruction and initiates the maintenance stage 120 so that information maintained by the Global Tracker 137, including the similarity matrix, is updated to indicate if the newly added VM image 208 shares any data blocks with other VM images 208 on any of the datacenters 204; or to indicate if any data blocks referenced by existing clusters are no longer available on a removed VM image (if removed entirely) or on a particular datacenter 204 (if removed only from that datacenter 204).

When method 100 is instructed to transfer a selected VM image 208 ("selected image") from a source datacenter 204 ("source datacenter") to a target datacenter 204 ("target datacenter"), method 100 identifies all the clusters needed to reconstitute the selected image, using the similarity matrix 500, in step 152. For example, if instructed to transfer Image-3 (shown in FIG. 2) from the source datacenter (not shown) to a target datacenter (not shown), method 100 identifies clusters 401, cluster 405, and cluster 406 (shown in FIGS. 4 and 5) as corresponding to the data blocks necessary to reconstitute Image-3 on the target datacenter. Method 100 does so by using the information maintained by the Global Tracker 137 (which includes the similarity matrix 500, and contains information about the VM image 208*a-c*, every cluster 401-406, and every datacenter 204).

Furthermore, in step 156, method 100 determines, by using the similarity matrix and the associated information maintained by the Global Tracker 137, which VM images 208 and which datacenters 204 each cluster identified in step 152 contain the identified clusters. In the above example, method 100 determines that cluster 401 exists in Image-3; cluster 405 exists in Image-2 and Image-3; and cluster 406 exists in Image-1, Image-2, and Image-3. Method 100 also determines which datacenters 204 contain each of the above identified VM images 208. Each identified VM image 208 may be shared, i.e. it may reside on more than one datacenter 204. Therefore, each of those VM images 208, and each of the datacenters 204 they reside on, may serve as a source for the corresponding data blocks.

As illustrated by the above example, although method 100 receives instructions to transfer Image-3 from the source datacenter to the target datacenter, it may not be necessary to make a transfer at all if all of Image-3's constituent data blocks already reside on the target datacenter as constituent data blocks of other VM images 208. Additionally, to the extent that Image-3 does not share constituent data blocks with the VM images 208 on the target datacenter, it may nevertheless share some or all of its constituent data blocks with the VM images 208 on other datacenters. Under either scenario, method 100 may be able to reconstitute the selected image on the target datacenter without transferring any data blocks to the target datacenter at all, or by transferring some or all of the necessary data blocks from a datacenter other than the source datacenter. These options allow method 100 to be selective in the resources it uses, such as bandwidth and speed of transfer, to make the transfer and reconstitution of the selected image more efficient, as compared to a direct transfer method.

More specifically, as it relates to the above example, the target datacenter may already store Image-1 and Image-2. Consequently, data blocks represented by cluster 406, which is shared between Image-1, Image-2, and Image-3, need not be transferred to the target datacenter, and are marked as existing thereon in step 164. Otherwise, method 100 determines if there is yet any other datacenter 204 that contains the data blocks necessary for transfer, in step 168. Therefore, the copies already on the target datacenter (as part of Image-1 and Image-2) may be used to reconstitute Image-3 on the target datacenter. Where data blocks belonging to Image-3 are not already on the target datacenter, they may nevertheless be on another datacenter from which a transfer may be faster or less costly than if the user-identified source datacenter were used. If the user-identified source datacenter is the only available source, then it is selected as the source to be used in step 176.

In step 172, method 100 determines an optimal plan for transferring and reconstituting the selected image, i.e., its constituent data blocks, on the target datacenter. The optimal transfer plan is configured to meet the needs of the particular embodiment in which it is employed, and may include user-defined parameters. According to an embodiment of the disclosure, the optimal plan is derived, in part, by determining the time and bandwidth required to transfer each data block from each potential donor datacenter to the target datacenter, where such a transfer is necessary. No transfer is necessary with respect to those data blocks that already exist on the target datacenter. The selection of which datacenter to use as a donor for a given cluster or set of data blocks is made by minimizing the sum of the products of three factors: time, bandwidth, and cost, for the data blocks transferred from donor datacenters; subject to a policy which may be pre-configured or defined by a user. More specifically, the above steps may be represented by a function, as follows:

$$\min_{\{t,j\}} \left\{ \max_{\{t,j\}} * \alpha * \sigma + [1-\alpha] * \sum_{j=1}^{D} B_j * t_j * \rho_j \right\},$$

such that $$\sum_{i=1}^{C} r_{i,j} * S_i * e_{i,j} - B_j * t_j = 0, \text{ for } j = 1, \ldots, D;$$

-continued $$\sum_{j=1}^{D} r_{i,j} * e_{i,j} - 1 = 0, \text{ for } i = 1, \ldots, C;$$

$r_{i,j} \geq 0$, for $i = 1, \ldots, C$ and $j = 1, \ldots, D$; and $t_j \geq 0$ for $j = 1, \ldots, D$;

where the above referenced parameters and variables are defined as follows:

| | Description |
|---|---|
| Input Parameter | |
| C | Number of clusters to be downloaded to the target datacenter |
| D | Number of donors |
| $e_{i,j}$ | Indicator variable, such that it equals 1 if cluster i is available on donor j, for $i = 1, \ldots, C$ and $j = 1, \ldots, D$ |
| $S_i$ | Size of cluster for $i = 1, \ldots, C$ |
| $B_j$ | Bandwidth between target and donor j for $j = 1, \ldots, D$ |
| $\rho_j$ | Cost of data transfer between donor j and the target for $j = 1, \ldots, D$ |
| σ | Value coefficient for transfer time, i.e., monetary value |
| α | Value between 0 and 1 representing relative importance of time and cost of transfer speed |
| Variable | |
| $r_{i,j}$ | Fraction of cluster i to be transmitted from donor j |
| $t_j$ | Time required to receive all data from donor j for $j = 1, \ldots, D$ |
| T | Time required to receive all data from all donors |

Method 100 determines each of the above values by using the similarity matrix and related information maintained by the Global Tracker 137, and, where appropriate, through user-input. Using the above values and functions, method 100 identifies the least costly donor to use for each cluster, based on a pre-configured or user-defined emphasis on saving time, or bandwidth.

In step 180, method 100 transfers all data blocks that are not already on the target datacenter to the target datacenter, using the donor datacenters (which may include the source datacenter) selected in step 172. The transferred data blocks, together with those that may already have existed on the target datacenter, are used to reconstitute the selected image on the target datacenter, in step 184. The reconstitution of the selected image is facilitated by mapping files created using the similarity matrix and other information maintained by the Global Tracker 137.

Figure 11:
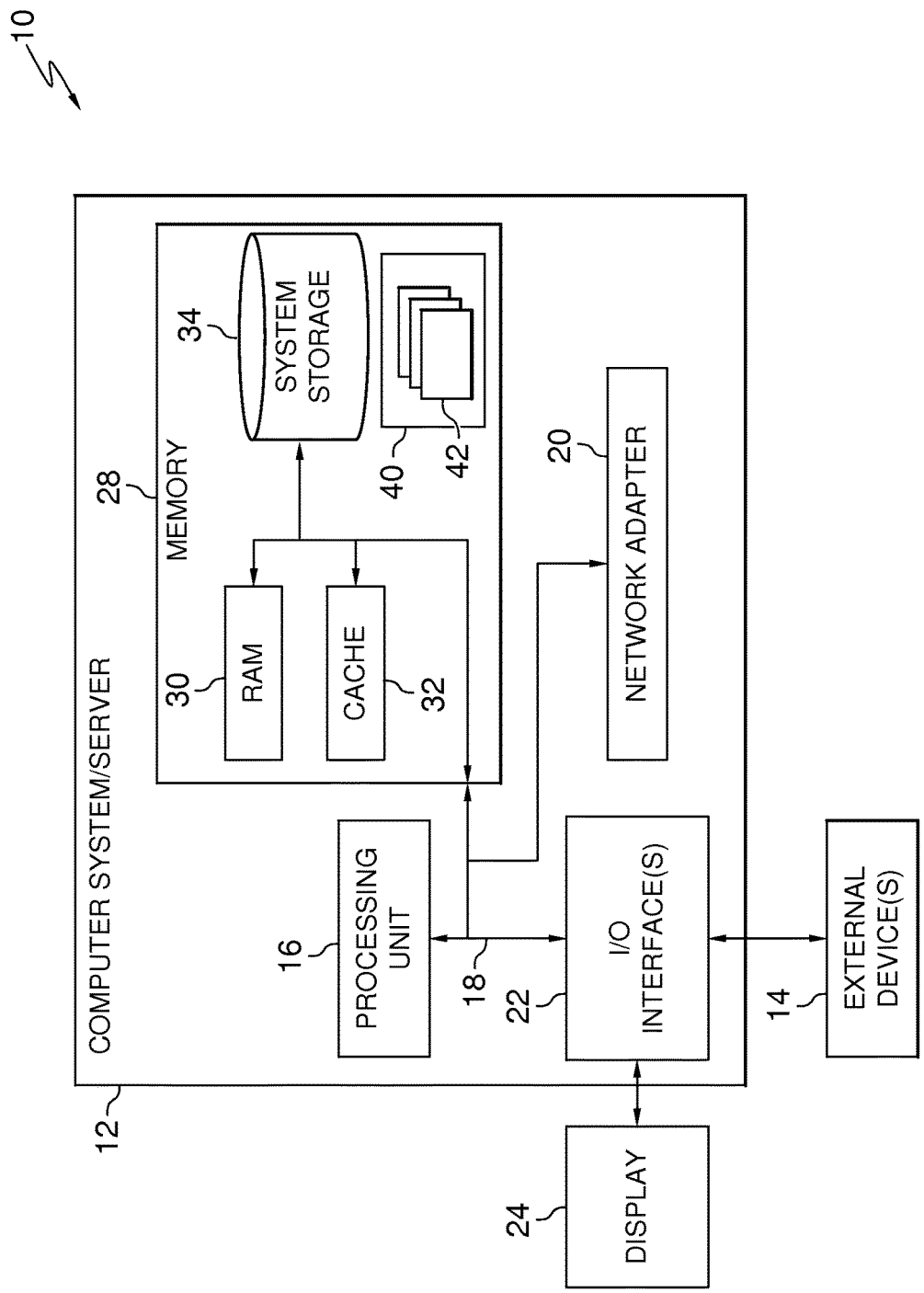
FIG. 11 is a block diagram of a computing device, according to an embodiment of the invention.

Thereby, method 100 for transferring virtual machine images between a plurality of nodes is described above which includes analyzing each of a plurality of VM images 208 present on a plurality of datacenters 204 to create image clusters corresponding to a plurality of data blocks present in the plurality of VM images 208, using the program and computer 12 as shown in FIG. 11. Method 100 generates the similarity matrix 500 using the created image clusters, and selects a VM image 208 present on the source datacenter to be reconstituted on the target datacenter. Method 100 identifies a plurality of data block sets in the selected VM image 208 for transfer and/or reconstitution on the target datacenter, using the similarity matrix. Method 100 further determines an optimal transfer plan for each data block set, and transfers the data blocks in those sets according to the optimal plan. Using the data blocks already existing on the target datacenter, and the data block sets transferred to the target datacenter, method 100 reconstitutes the selected VM image 208.

Accordingly, implementation of the disclosed invention is highly effective in intelligently allocating system and network resources to transfer unique data block sets (the clusters) between datacenters 204; it has a measured efficiency gain of 50% to 80% in bandwidth consumption and transfer time when compared to existing technologies such as rsync-based transfers. Such high efficiency gains are possible because the disclosed invention takes advantage not only of data redundancy in individual VM images, but also across multiple VM images within a datacenter and across multiple datacenters, and from repositories within regions. Furthermore, the disclosed invention takes into account pre-configured or user-determined preferences. For example, it may allocate a higher bandwidth (at a higher cost) to accommodate a user's preference for immediate availability of a given VM image on a target datacenter. Additional efficiency may be gained by combining features of the disclosed invention with existing solutions, such as source-side deduplication, to eliminate the need to monitor, analyze, and/or clusterize redundant data on any given VM image. Additional efficiency may be achieved by retaining a number of most frequently used blocks from the clusters in memory, thus eliminating the requirement that these blocks be read from local disk.

Illustrative environments that may deploy embodiments of the disclosed invention include: a public cloud computing environment comprising multiple datacenters, where a service provider may create a new VM image catalog that requires propagation across the cloud, along with subsequent security updates and patches, or where a client VM image is needed on multiple datacenters for high availability; VM image export/import between different cloud environments or hypervisors; DevOps operations having multiple clouds for the development/testing, staging, and production stages of the DevOps process; and hybrid cloud environments, where a customer's private cloud interacts with a public cloud.

Figure 6:
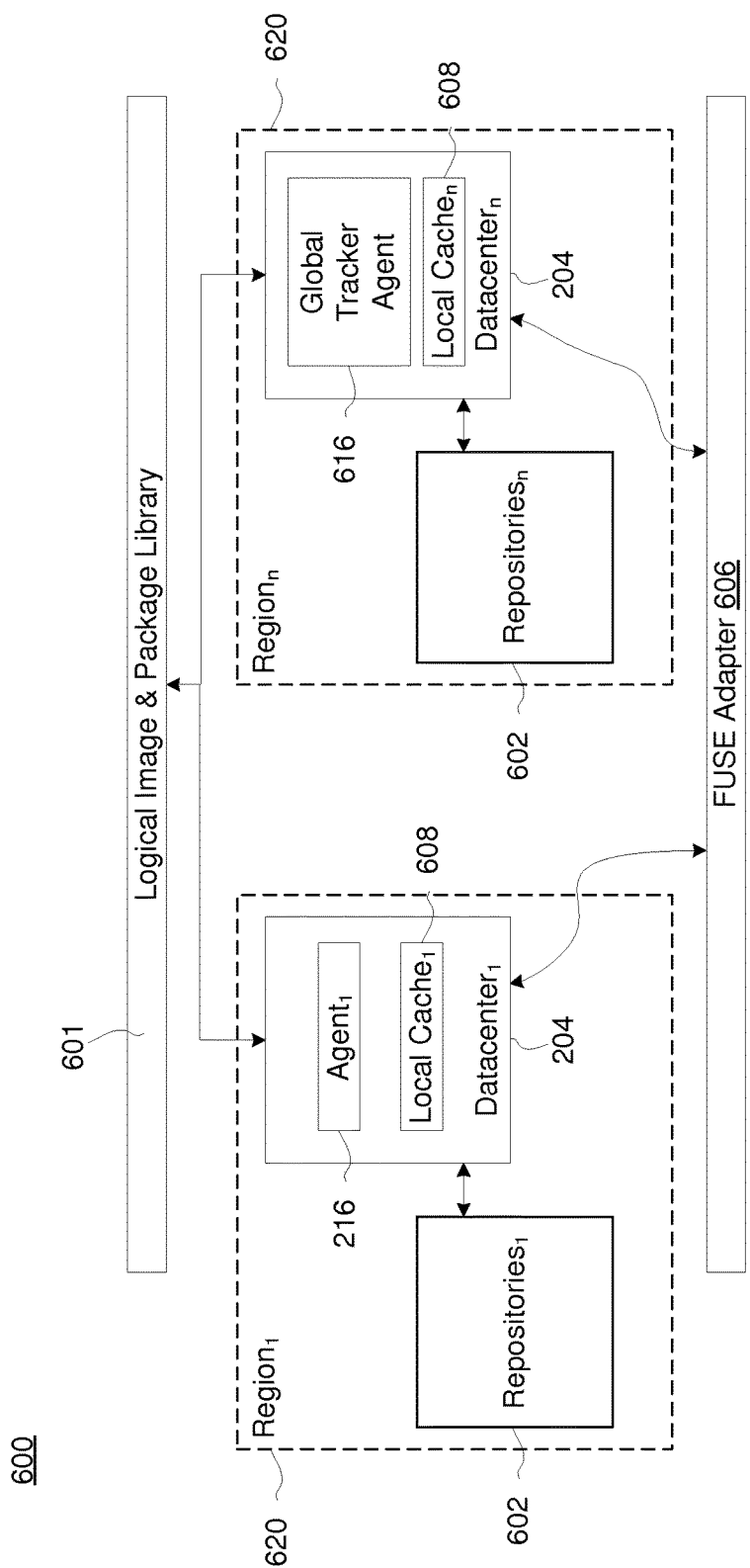
FIG. 6 is a cloud computing environment, according to an embodiment of the invention.

FIG. 6 is a block diagram of a cloud computing environment 600, according to an embodiment of the invention. One or more components of cloud computing environment 600 may be the same as or similar to components of cloud computing environment 200 (FIG. 2). Accordingly, similar components share the same reference numbers as those in FIG. 2. However, components referenced in one cloud computing environment may have fewer, additional, or different functionalities compared to similarly referenced components in the other cloud computing environment, according to various embodiments of the invention, as described herein.

Cloud computing environment 600 includes logical image and package library 601, one or more datacenters 204 (for example, Datacenters$_{1-n}$), and FUSE adapter 606. Datacenters 204 may be associated with one or more regions 620 (for example, Regions$_{1-n}$). Each datacenter 204 may include an agent 216 (for example, Agents$_{1-n}$), a local cache 608 (for example, Local Caches$_{1-n}$), and one or more datacenter repositories 602 (for example, Repositories$_{1-n}$). Each of these components is described in greater detail, below.

Logical image and package library 601 (hereinafter, "library 601") represents the collection of information about data stored on the various datacenters 204. This information may include, for example, VM images, software packages, or other data that is stored on datacenters 204.

Each datacenter 204 may include data stored on a tangible storage device of the datacenter, an agent 216 component, and a local cache 608 component. For example, Datacenter) may have one or more VM images and/or one or more software packages stored on one its tangible storage devices. Agent$_1$ may track information about a local logical library, thereby tracking data that is present on Datacenter$_1$. Agent$_1$ may interface with other agents 216 and other components of cloud computing environment 600 to track, store, load, update, or communicate information regarding the data available on Datacenter$_1$. Local caches may store, for example, data that is to be transferred to Datacenter$_1$ from one or more other data sources.

The information that may be stored or otherwise made available on datacenters 204 may include, without limitation, one or more of the following: VM images in various formats such as raw, qcow2, vmdk, iso, and others; and packages in various formats such as tar.gz, tar.bz2, tar.xz, tgz, zip, tar, rar, rpm, tcdriver, and others.

Generally, repositories 602 may include one or more servers associated with one or more regions 620 (a region may also be referred to as a zone). Repositories 602 may be, for example, FTP or HTTP servers that provide downloads of packages and installers from software providers; for example, rpms, jdk, or tarballs. Repositories 602 may be part of, or may be external to, the datacenters 204 with which they are associated.

Regions 620 are groupings or associations of datacenters 204 and repositories 602. A region 620 may correspond to a geographical region, or may be based on another grouping. For example, Datacenter$_1$ and Repositories$_1$ are both associated with Region$_1$. The association may be based on one or more factors, including, without limitation: geographical proximity (the infrastructure of Datacenter$_1$ may be in the same geographical region as Repositories$_1$, for example, Europe); cost factor (for example, some repositories may be more expensive to maintain and/or access); accessibility factor (for example, some repositories may be up and accessible, or down and inaccessible); bandwidth characteristics; and other factors.

In one embodiment, each region 620 may include multiple datacenters 204 and associated repositories 602.

Fuse adapter 606 may be a component of cloud computing environment 600 that converts data to be transferred from one datacenter 204 to another. Fuse adapter 606 may be a standalone component of cloud computing environment 600 (embodied as, for example, a computing device), or may be distributed across one or more datacenters 204. In one example, data to be transferred from Datacenter$_1$ to Datacenter$_2$ may be stored in zip format, but a preferred-archive-format in cloud computing environment 600 may be tar format. In one example, data from Datacenter$_2$ destined for Datacenter$_1$ may be transferred to Datacenter$_1$, where it may be stored in Local Cache$_1$. Datacenter$_1$'s local instance of fuse adapter 606 may identify that the data in Local Cache1 is in zip format, determine that it should be converted to tar format, and may then convert the data as determined. The converted data may then be stored on a tangible storage device of Datacenter$_1$.

With continued reference to FIG. 6, some uses and features of cloud computing environment 600 are described in reference to an example use case, in light of alternative cloud computing environments that lack such features. In the example use case, a software provider may make software packages available for download by the software provider's customers by hosting copies of the software packages on one or more datacenters 204 as part of cloud computing environment 600. The hosted copies may be, for example, mirrors of one another. Providing mirrored software downloads allows the software provider to facilitate a larger number of download requests across multiple regions 620. Without mirroring, customers in different regions may need to compete for server connections and bandwidth, and customers who are father from the server or have weaker connectivity will have a negative experience in downloading the software packages.

A challenge in providing mirrored downloads is that software packages (as is the case with many other data types) are periodically updated. This means that a change in a software package requires synchronization across all datacenters 204 selected for hosting the mirrored software package. Furthermore, customers wishing to select a particular datacenter 204 best suited for use by them will need to wait until the software package is synchronized at that particular datacenter 204 before they can access the software package.

Crude updating methods include packaging full binary versions of the software package (or other data) to be transferred along with corresponding signatures for use in data integrity verification, and transferring the entirety of the full binary versions from a source datacenter 204 to one or more target datacenters 204 across multiple regions 620. In one example, PGP/ASC signatures and MD5, or SHA256 hash values may be used for the files in the packages, so that once a download/transfer is complete, the downloaded content can be verified using the signatures/hash values. Transfer mechanisms such as rsync and torrent transfers cause complete copies of packages to be transferred. Rsync can work on tar files that breaks the file into sections, and sends only the changes based on cryptographic hashes of the sections. However, rsync looks only within the file being synchronized, and does not take advantage of similarities across files or other data. Furthermore, one consideration that is ignored by the prior art is that patching and updating of data can cause the data to become fragmented over time. Even though the data may already be separately available on a target datacenter 204, standard patching of images or open virtualization appliance (OVA) containing open virtualization format (OVF) data in the source datacenter 204 still involves copying the full image to the target datacenter 204.

In a further example use case, customers of a cloud computing service provider may host their files on cloud computing environment 600. The customers may periodically, or even very frequently, update their files. These files may be hosted on multiple datacenters 204 for accessibility across multiple regions 620, and/or for fault tolerance. This example use case presents great challenges as the number of customers, the size of their data, and the need to access and synchronize that data, becomes greater. A crude method of transferring entire files does not provide satisfactory results.

With continued reference to FIG. 6, cloud computing environment, according to various embodiments of the invention, may employ one or more of the following features and techniques, which will be discussed in greater detail in connection with methods of using cloud computing environment, as described in connection with FIGS. 8 and 9.

Accordingly, embodiments of the invention may use source-side block level and file level analysis to prevent transfers of redundant data from a first source datacenter 204 to a target datacenter 204 that either already exists on the target datacenter 204, or can be obtained more efficiently from a second source datacenter 204. Thereby, only unique data is sent via a block-level, incremental transfer.

In one embodiment compressed on non-block-boundary archives (for example, images, packages, or data folders) are inspected and recursively converted into archives with block boundaries based on a similarity index in library 601. According to an embodiment, the similarity index may be generated as follows: a single tar of tar archives may be generated from a directory of different kinds of files and archives. The process may begin by searching for archives present in a given directory path with the number of blocks greater than a configurable number, for example 64. Unknown archive types may be left untouched, since any work on them may be wasted work. Thereafter, the similarity index of the archive may be calculated against the image library by computing a content digest for the archive (computing distinct set of blocks (with SHA1 values) and the number of occurrences (internal redundancy–number of blocks) in the archive. A numerator value and a denominator value may be initialized as zero. For each SHA1 value, if it is present in the image library, the numerator value is increased by the number of blocks represented by the SHA1. A bloom filter may be used for searching the image library. Although false positives are possible, the error rate has a certain configurable probability, and can be adjusted to allow for fast computations. Thereafter, the denominator value is increased by the number of blocks represented by the SHA1. Upon ending of the calculations, the similarity index may be calculated as the result of the numerator value divided by the denominator value.

In one embodiment, if the similarity index is below a configurable threshold, for example 90%, the archive may be extracted into a temporary directory. Otherwise, it may be untouched since there may be no benefit from extracting it any further.

The process may be recursively repeated to find the archives present in the temporary directory.

A new archive (tar file) may be created from the given directory path.

In one embodiment, a weak checksum may be used to quickly find blocks and block boundaries (for example, 4K boundaries) using, for example, Rabin fingerprinting.

In one embodiment, signatures may be computed and maintained for identified blocks, including block level file content, and for package files. Signatures may be used to identify blocks. Examples of such signatures include MD5, SHA1, SHA256, and SHA512.

In one embodiment, repository 602 checksum metadata/information may be retrieved and maintained for available packages in one or more regions 620.

In one embodiment, cluster information about identified blocks of data may be computed and maintained by comparing block/package signatures in data to be transferred to those present on datacenters 204 and/or repositories 602 in a target region 620, and by reconstituting the data in the target region 620 (on corresponding datacenters 204 and repositories 602) using local image and package libraries and transferring clusters from peer datacenters 204 when clusters are not locally available.

In one embodiment, peer-to-peer transfers may be made to allow simultaneous reconstitution of data on target datacenters 204 by computing a mapping of data for reconstitution using clusters and data in multiple datacenters 204.

Embodiments of the invention may repackage previously unpacked archives prior to transferring them, thereby allowable deduplication and providing the corresponding data in multiple formats.

Embodiments of the invention may use a similarity index (for example, as available in IBM® WebSphere® or IBM® DB2®) to identify and map nested archives having and to recursively repackage the archives.

Embodiments of the invention may avoid storing data in or transferring data to certain datacenters 204 by using data already available in repositories 602 local to a given region 620, thereby avoiding intra-regional transfers.

Figures 7A, 7B:
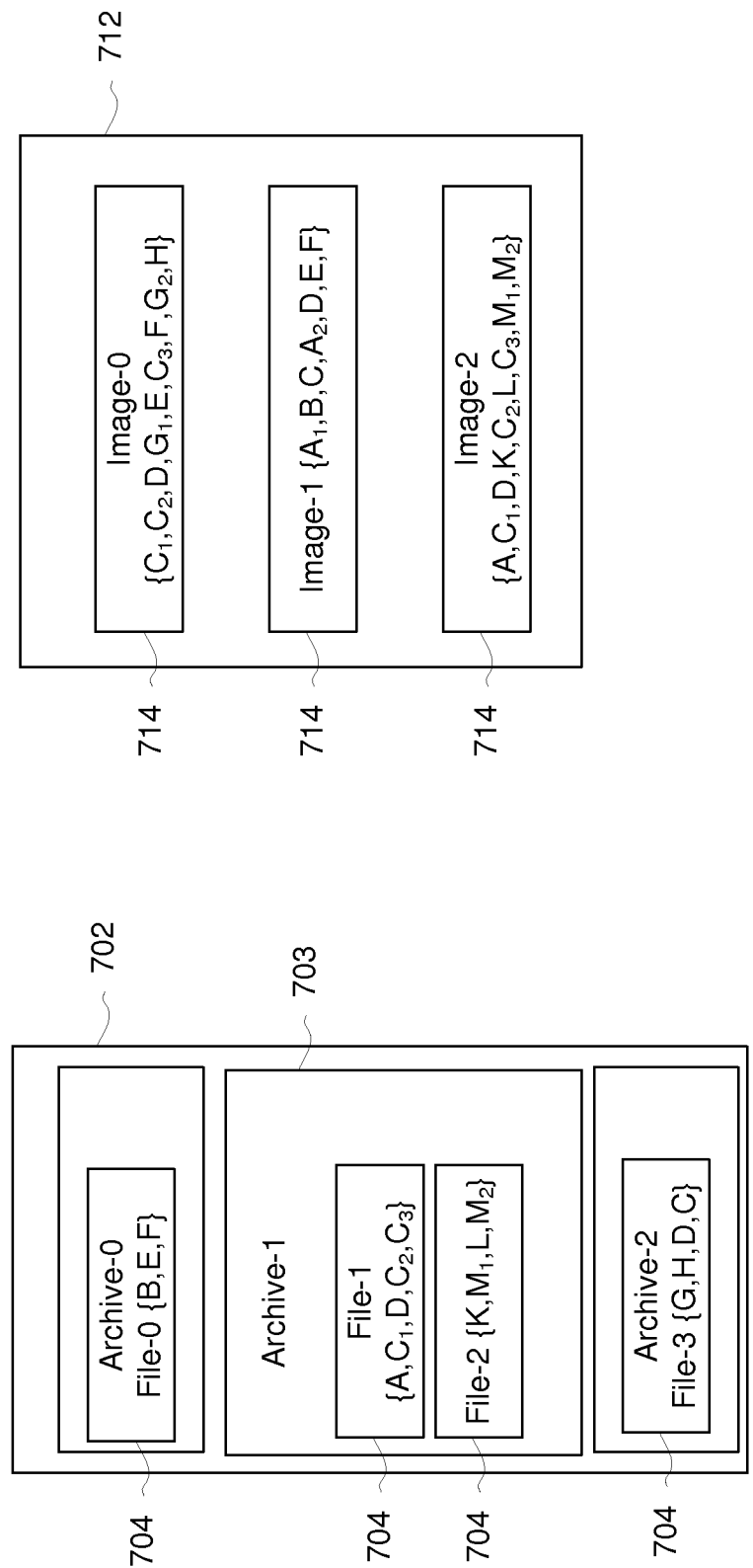
FIG. 7A is a block diagram depicting metadata associated with archived and non-archives files hosted on datacenters and regional repositories, according to an embodiment of the invention.
FIG. 7B is a block diagram depicting metadata associated with virtual machine images on datacenters and regional repositories, according to an embodiment of the invention.
Figure 7C:
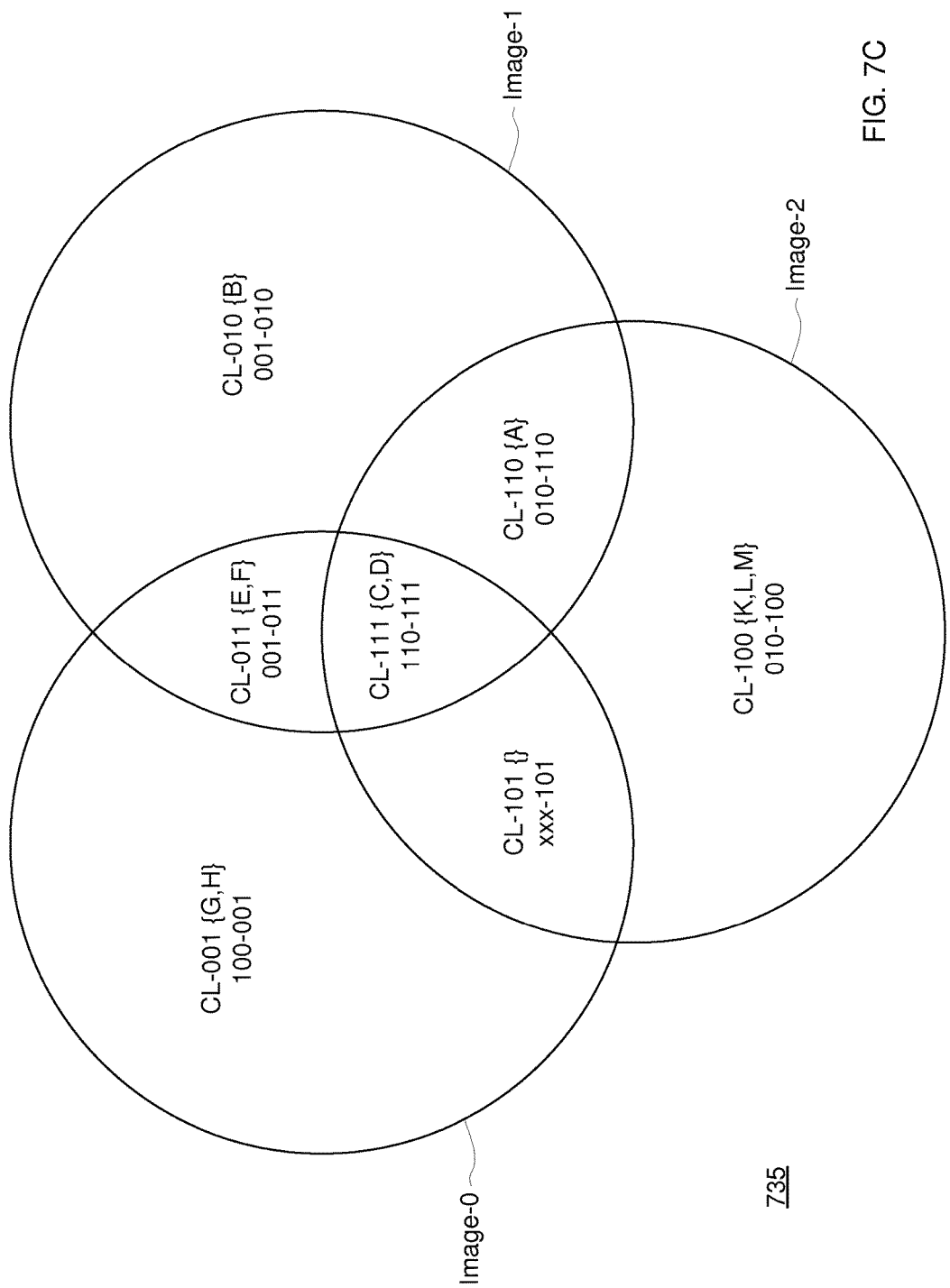
FIG. 7C is a Venn diagram depicting similarities of the metadata of FIG. 7B, according to an embodiment of the invention.

FIGS. 7A-C depict examples of files and VM images having data blocks and associated calculated checksums and associated clusters that may be generated by embodiments of the invention. These examples are referred to in connection with FIGS. 8, 9, and 10A-C to describe embodiments of the invention.

Figure 7F:
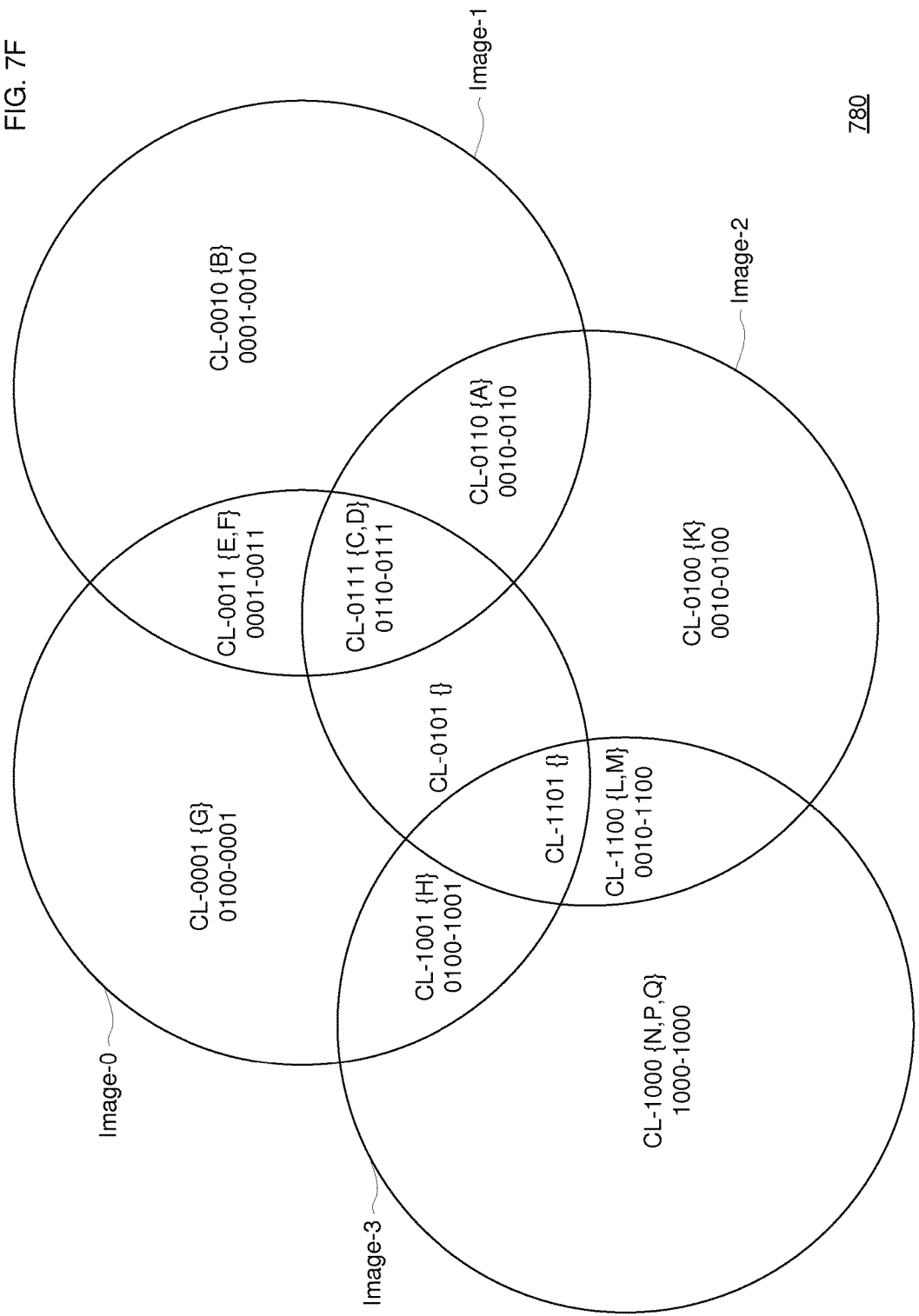
FIG. 7F is a Venn diagram depicting similarities of the metadata of FIG. 7E, according to an embodiment of the invention.

FIGS. 7D-F depict additional examples of files and VM images having data blocks and associated calculated checksums and associated clusters that may be generated by embodiments of the invention. These examples are referred to in connection with FIGS. 8, 9, and 10D to describe embodiments of the invention.

Referring now to FIG. 7A, an example of a set 702 of files 704 having identified block-level checksums is depicted, according to an aspect of the invention. These files 704 may, but need not, share one or more data blocks with one another and with one or more VM images on cloud computing environment 600. Files 704 may correspond to archive files that may be stored on one or more datacenters 204 and repositories 602 (FIG. 6). Archive files on repositories may only provide package level checksums, they may not provide block level checksums, in which case only package level checksums are utilized for similarity index. When these packages are first downloaded locally to any datacenter, the archives will be converted to tar and block level checksums will be computed.

In the depicted example, each file 704 is represented with an identifier (for example, File-0 through File-3), along with letters representing a checksum of corresponding data blocks in the file. For example, File-0 includes checksums data blocks {B,E,F}, where each letter represents a unique checksum of a corresponding data block. File-1 includes distinct data blocks {A,C,D}, and may also include multiple copies of some of the blocks (internal redundancy). For example, data block C appears three times in File-1, and is therefore represented by the same checksum. For illustration purposes, however, the checksum is labeled with a subscript to indicate that it is a copy. In actual implementation, this information (that a given data block is a copy of an existing data block) may be indicated by metadata stored as part of the file or as part of an index. File-2 includes distinct data blocks {K,M,L}, and copies of some of them. File-3 includes distinct data blocks {G,H,D,C}.

In the depicted example, File-1 and File-2 may be constituent files of an archive file 703, whose format may be, for example, tar, tgz, zip, or other archive file format.

Referring now to FIG. 7B, an example of a set 712 of VM images 714 having identified block-level checksums is depicted, according to an aspect of the invention. These VM images 714 may, but need not, share one or more data blocks with one another and with one or more files 704 (FIG. 7A) on cloud computing environment 600. In the depicted example, each VM image 714 is represented with an identifier (for example, Image-0 through Image-2), along with letters representing a checksum of corresponding data blocks in the VM image.

In the depicted example, Image-0 includes distinct data blocks {C,D,G,E,F,H}, with some data blocks repeated, as denoted by subscripts. Image-1 includes distinct data blocks {A,B,C,D,E,F}, with some data blocks repeated. Image-2 includes distinct data blocks {A,C,D,K,C,L,M}, with some data blocks repeated.

Referring now to FIG. 7C, a Venn diagram 735 is shown identifying how data blocks of VM images 714 of FIG. 7B are shared. Although Venn diagram 735 shows similarities between data blocks of VM images 714, it is expanded to show similarities between these VM images 714 and archives 704 (FIG. 7A). For example, the CL-111 includes blocks from the Archive 1 (File-1) and Archive 2 (File-3) but does not include blocks from Archive-0 (File-0). This is represented by the 110 prefix in 110-111 (shown below CL-111). A similar Venn diagram can identify shared data blocks between files 704 (FIG. 7A).

The information depicted in FIG. 7C is similar to the information depicted in FIG. 4 and includes overlap with archives. In the depicted example, Venn diagram 735 includes three circles, where each circle represents one of the three VM images 714 (FIG. 7B): Image-0, Image-1, and Image-2. Each circle has four sections, where each section identifies a cluster: a first section corresponding to data blocks contained only in the corresponding VM image 714, known as a singleton cluster (note however that because of overlap with archives, it is not a singleton anymore); second and third sections corresponding to data blocks contained in the corresponding VM image 714 and in only one other VM image 714; and a fourth section corresponding to data blocks contained in the corresponding VM image 714 and all other VM images 714. The latter two also show overlap with archives. The information depicted in FIG. 7C is for illustration purposes. This information may be stored, in one embodiment, by agents 216 of cloud computing environment 600 (FIG. 6).

In the depicted example, there are a total of six non-empty clusters: CL-001 (100-001), CL-010 (001-010), CL-011 (001-011), CL-100 (010-100), CL-110 (010-110), and CL-111 (110-111), where the rest of the clusters are empty; for example CL-101 (xxx-101) and the other combinations for the archives. In FIG. 7C, as described above in connection with FIG. 4, clusters are identified using a unique bitset. The number of bits in the bitset corresponds to the number of VM images and archives whose shared data blocks the clusters represent. In this example, the cluster identifiers have six bits, three bits for archives 703 in FIG. 7A and three for the VM images 714 in FIG. 7B, whose similarity they represent. Each depicted cluster includes a list of distinct data blocks that are shared by the VM images 714 represented by the section of Venn diagram 735 in which the cluster appears. Individual files within the archives are not required to be represented by the cluster bitsets. The nested files that may be archives are also not required to be represented by the cluster bitsets. Only the top level archives are present in the bitsets. This allows for large archives that can be grouped into larger sized clusters and thus reduces cluster maintenance overhead.

In the depicted example, CL-001 (100-001) is a cluster containing data blocks from Image-0 and Archive-2 (File-3) {G,H}. CL-010 (001-010) is a cluster containing data blocks from Image-1 and Archive-0 (File-0) {B}. CL-100 (010-100) is a cluster containing data blocks from Image-2 and Archive-2 (File-2) {K,L,M}. CL-011 (001-011) is a cluster with data blocks from Image-0 and 1 and Archive-0 (File-0) {E,F}. CL-101 (xxx-101) represents clusters with data blocks from Image-0 and 2 {Empty}. CL-110 (010-110) is a cluster with data blocks from Image-1 and 2 and Archive-1 (File-1) {A}. CL-111 (110-111) is a cluster with blocks from Image-0, 1 and 2 and Archive-1 (File-1) and Archive-2 (File-3) {C,D}.

The information depicted in Venn diagram 735 may also be generated, represented, and stored, as a similarity matrix, similar to similarity matrix 500 (FIG. 5) generated using method 100 (FIG. 1), or a variant thereof.

Referring now to FIG. 7D, another example of a set 730 of files 704 is shown, including Files-0 through 3 as described in connection with FIG. 7A, above. The set 730 also includes Archive-3 706, including constituent files 704: File-4 {N} and File-5 {P,Q}. Files-1 and 2 may be, for example, a tarball file (in tar, tgz, zip, or other archival format). Files-4 and 5 may also be a second tarball file similar to Files-1 and 2. Note that although not explicitly described as archived files in FIGS. 7B and 7D, Files-0 and 3 may also be archived files that may in turn contain additional archived and non-archived files.

Referring now to FIG. 7E, an additional set 752 of VM images 714 is shown, including Images-0 through 2 as described above in connection with FIG. 7B, above. The set 752 also includes Image-3 {H,N,L,M,P,Q}.

Referring now to FIGS. 7D-F, a Venn diagram 780 illustrates shared components of Images-0 through 3, including their similarity clusters. Note that since four VM images are represented, the bitstring identifiers for the clusters contain four bits. Note also that the singleton clusters for Images-0 and 2 have changed as compared to the Venn diagram 735, which is a reflection of the fact that Image-3 shares some data blocks with Images-1 and 2. Additional four bits prefix is for the four archives in FIG. 7D thus requiring total of eight bits (4 Archives+4 Images).

In an embodiment of the invention, a VM image is treated as an archive and repackaged by computing similarity index of its constituent files. This may be the case, for example, for mksysb resource that is a backup of a root volume group on AIX systems, or image formats that do not store files at a block boundary. Treating a VM image as an archive may also be desirable where the VM image contains a large number of archives. When reconstituting the VM image, there may be a need to regenerate the same (or different file system) within the VM image, and to add the relevant files back to the file system through the FUSE adapter 606.

Figure 8:
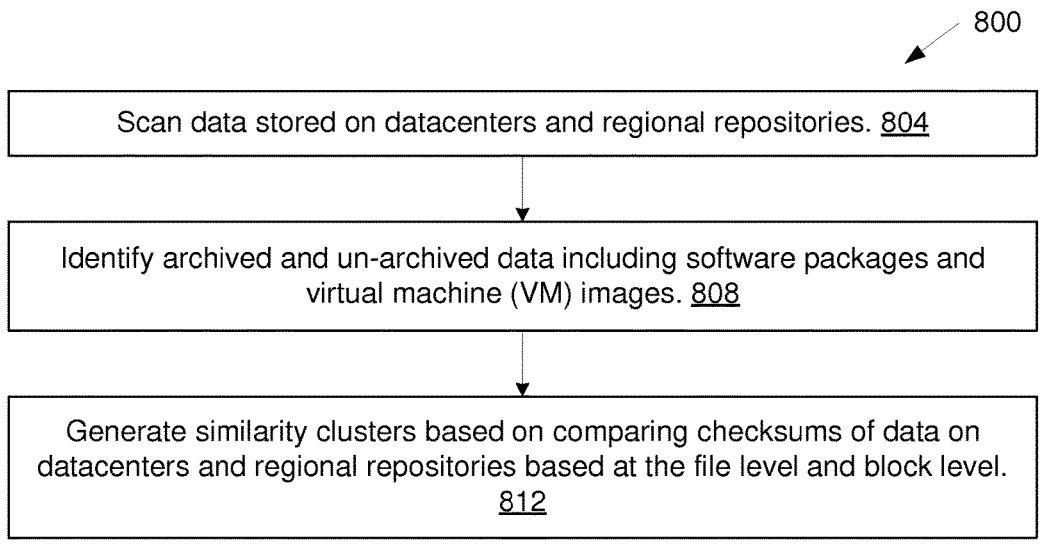
FIG. 8 is a method for managing data on the cloud computing environment of FIG. 6, according to an embodiment of the invention.

FIG. 8 is a flowchart of a method 800 for managing data on a set of computing nodes, according to an embodiment of the invention. The set of computing nodes may be, for example, datacenters 204 and regional repositories 602 of cloud computing environment 600 (FIG. 6). Method 800 may be embodied as program instructions executable by a processor of a computing device, including for example, a processor of Datacener$_n$ (FIG. 6).

Referring now to FIGS. 6 and 8, Global Tracker Agent 616 may scan data stored on datacenters 204 and regional repositories 602 (where regional repositories are identified based on associations with regions 620 with which datacenters 204 are also associated) (step 804). For example, Global Tracker Agent 616 may scan VM images and archived files (such as software packages) or un-archived files stored on datacenters 204. Scanning data (step 804) may include identifying all data and associated metadata. Global Tracker Agent 616 may generate one or more index files, libraries, and other documents to track the data stored on various components of cloud computing environment 600.

Global Tracker Agent 616 may identify the scanned data as VM images, software packages, archived packages, un-archived packages, or other data types (step 808). If a file is archived or compressed, Global Tracker Agent 616 may un-archive or decompress the file. Global Tracker Agent 616 may also identify individual files within an archive, and blocks within each file. The un-archiving may be recursive to identify and un-archive nested archives.

Global Tracker Agent 616 may calculate block-level and file-level checksums for each identified block and file, and store them in an index file.

For data stored on and scanned from regional repositories 602, Global Tracker Agent 616 may retrieve and maintain corresponding repository checksum information (for example, metadata). For example, if a regional repository 602 for a given region 620 includes software packages made available for download by a software provider in that region 620, the software provider may have included, as part of the available download, checksums for the downloadable file. Global Tracker Agent 616 may retrieve and maintain this information, which may be used in other steps to generate similarity clusters.

Global Tracker Agent 616 may use information gathered and generated at steps 804 and 808 to generate similarity clusters (step 812), based on comparing checksums of the scanned data. Generating clusters may be done in the same way as described in connection with FIGS. 1, 4 and 5, above.

For example, Global Tracker Agent 616 may begin with an empty cluster index, and may further generate singleton clusters for each scanned data set (for example, for each scanned archive or VM image). Global Tracker Agent 616 may begin by adding one singleton cluster to the empty cluster index. Thereafter, Global Tracker Agent 616 may compare each additional singleton cluster to any cluster already added to the cluster index. If the singleton cluster selected for comparison shares no data blocks with a cluster already in the cluster index, the singleton cluster is added to the cluster index. However, if the singleton cluster shares data blocks with an existing cluster in the cluster index, the singleton cluster may be split into two clusters, such that one of the two split clusters corresponds to blocks shared by the singleton cluster and the existing cluster, and the other of the two split clusters corresponds to un-shared blocks. Global Tracker Agent 616 may track clusters as they are added, and compare split clusters with existing clusters to generate additional clusters.

Global Tracker Agent 616 may limit the number of comparisons and the number of resulting clusters in the cluster index, as described in connection with method 100 (FIG. 1).

Global Tracker Agent 616 may generate and maintain a similarity matrix similar to similarity matrix 500 shown in FIG. 5. The similarity matrix may be used to identify clusters and facilitate generating replication plans.

Figure 9:
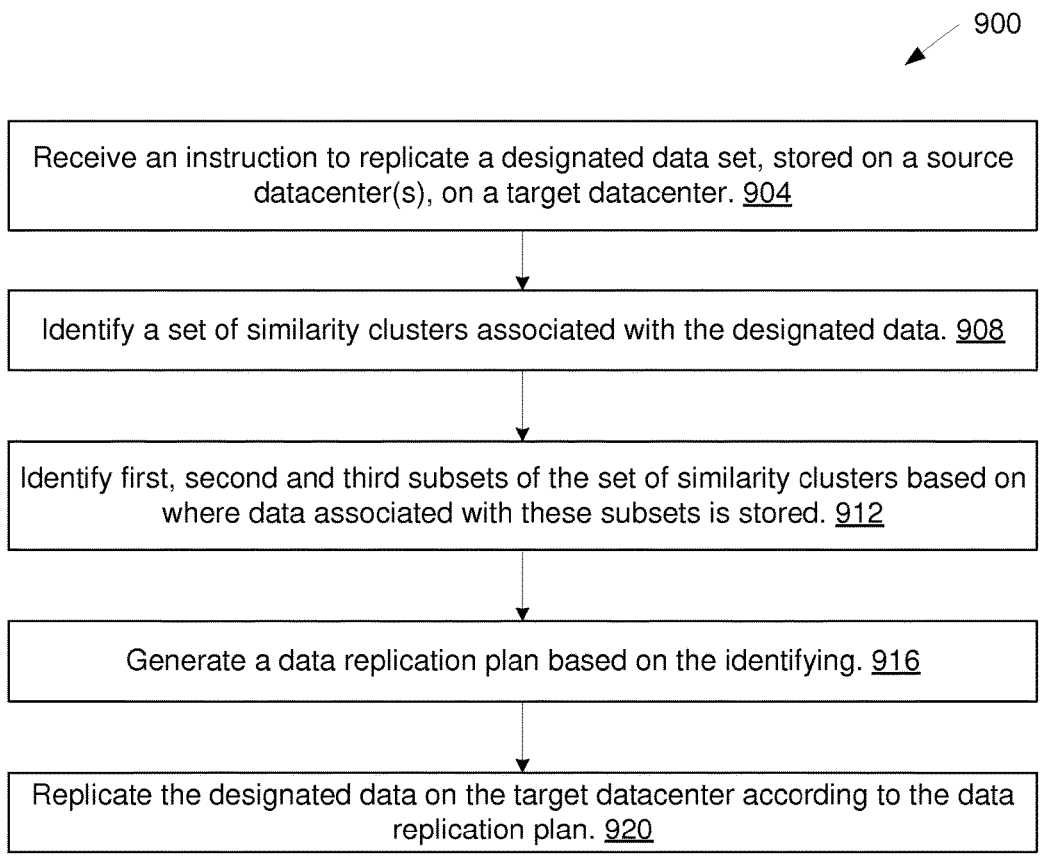
FIG. 9 is a method for managing data on the cloud computing environment of FIG. 6, according to an embodiment of the invention.

FIG. 9 is a flowchart of a method 900 for managing data on a set of computing nodes, according to an embodiment of the invention. The set of computing nodes may be, for example, datacenters 204 and regional repositories 602 of cloud computing environment 600 (FIG. 6). In one embodiment, method 900 may supplement or use outputs of method 800 (FIG. 8). Method 900 may be embodied as program instructions executable by a processor of a computing device, including for example, a processor of Datacener$_n$ (FIG. 6).

Referring now to FIGS. 6 and 9, Global Tracker Agent 616 may receive an instruction to replicate a designated data set, stored on a source datacenter, on a target datacenter (step 904). For example, Global Tracker Agent 616 may receive an instruction to replicate a particular software package, stored on Datacenter$_1$ or regional Repository$_1$, on Datacenter$_2$. The instruction may be triggered in several ways, including, for example: receiving an instruction from a user, where the instruction specifies parameters of the operation to be carried out; and detecting a change in a data set and designating the data set for replication.

Global Tracker Agent 616 identifies a set of similarity clusters associated with the designated data set (step 908) by consulting, for example, the similarity matrix generated by method 800 (FIG. 8).

Global Tracker Agent 616 also identifies (step 912) first, second, and third subsets of the set of similarity clusters (determined at step 908) based on where the associated data of these subsets is stored. Global Tracker Agent 616 may do this by consulting the similarity matrix.

Generally, Global Tracker Agent 616 may identify the first, second, and third subsets of the similarity clusters, as follows: some similarity clusters may not be shared by any datacenter 204 or regional repository 602; they may be associated only by the source datacenter 204. This indicates that the data associated with those similarity clusters is stored only on the source datacenter 204. Replicating this data on the target datacenter 204 requires transferring the data from the source datacenter to the target datacenter. These similarity clusters may be referred to as the first subset of similarity clusters. In one embodiment, the first subset of similarity clusters may be empty.

Some similarity clusters may be shared by the target datacenter 204. This indicates that the data associated with those similarity clusters is already stored on the target datacenter 204, and need not be transferred to it. These similarity clusters may be referred to as the second subset of similarity clusters. In one embodiment, the second subset of similarity clusters may be empty.

Some similarity clusters may be shared by the source datacenter 204 and at least one datacenter 204 other than the source datacenter and other than the target datacenter 204. These similarity clusters may be referred to as the third subset of similarity clusters. This indicates that the data associated with those similarity clusters is not already on the target datacenter 204. Replicating the associated data requires transferring it from the source datacenter 204, the at least one datacenter 204, a regional repository 602, or a combination thereof. In one embodiment, the third subset of similarity clusters may be empty. Rules may be implemented for selecting one or more preferred repositories. This may be accomplished, for example, by associating a trust factor to a repository(ies) by external vendors; the higher the trust factor of the repository, the more likely it would be that the repository is selected. In one example, the highest trust factor may be assigned, by default, to datacenters.

Global Tracker Agent 616 may generate a data replication plan (step 916) based on the first, second, and third subsets of the set of similarity clusters (identified at step 912). Generating the data replication plan may be based on one or more replication rules. A non-exclusive and non-exhaustive list of rules may include, for example, the following: (i) a data block should not be transferred from any datacenter 204 or regional repository 602 if it already exists on the target datacenter 204 as part of an existing VM image, file, or other data type, regardless of format; (ii) if a data block is not on the target datacenter 204, it should be transferred from a preferred source (a preferred source may be, for example: a regional repository 602 as compared to another datacenter 204; a datacenter 204 or a regional repository 602 having the highest available bandwidth, or lowest associated cost). Other rules are possible.

Global Tracker Agent 616 may replicate the designated data on the target datacenter 204 according to the data replication plan (step 920). For example, Global Tracker Agent 616 may initiate transfers of data associated with the first subset of similarity clusters from the source datacenter 204 to the target datacenter 204. Global Tracker Agent 616 may also initiate transfers of data associated with the third subset of similarity clusters from one or more corresponding datacenters 204 (including, possibly, the source datacenter 204) and/or regional repositories 602.

Global Tracker Agent 616 may cause repackaging/re-archiving of files that are un-archived prior to, or subsequent to any transfer using, for example, FUSE adapter 606. In one embodiment, the repackaging may be performed by a local instance of FUSE adapter 606 on the target datacenter 204.

In one embodiment, Global Tracker Agent 616 may perform the transfers, according to the replication policy, using Peer-to-Peer transfers, thereby allowing simultaneous replication on multiple datacenters 204.

Global Tracker Agent 616 may reconstitute the designated dataset (step not shown) on the target datacenter 204 once data associated with all identified subsets of similarity clusters (except for the second subset and for empty subsets) has been transferred to the target datacenter 204. Note that a given VM image or file that is to be reconstituted may require several copies of the same data block or file for a complete replication/reconstitution; it is necessary, however, only for one copy to be transferred (if not already on the target datacenter 204) under method 900.

Figure 10A:
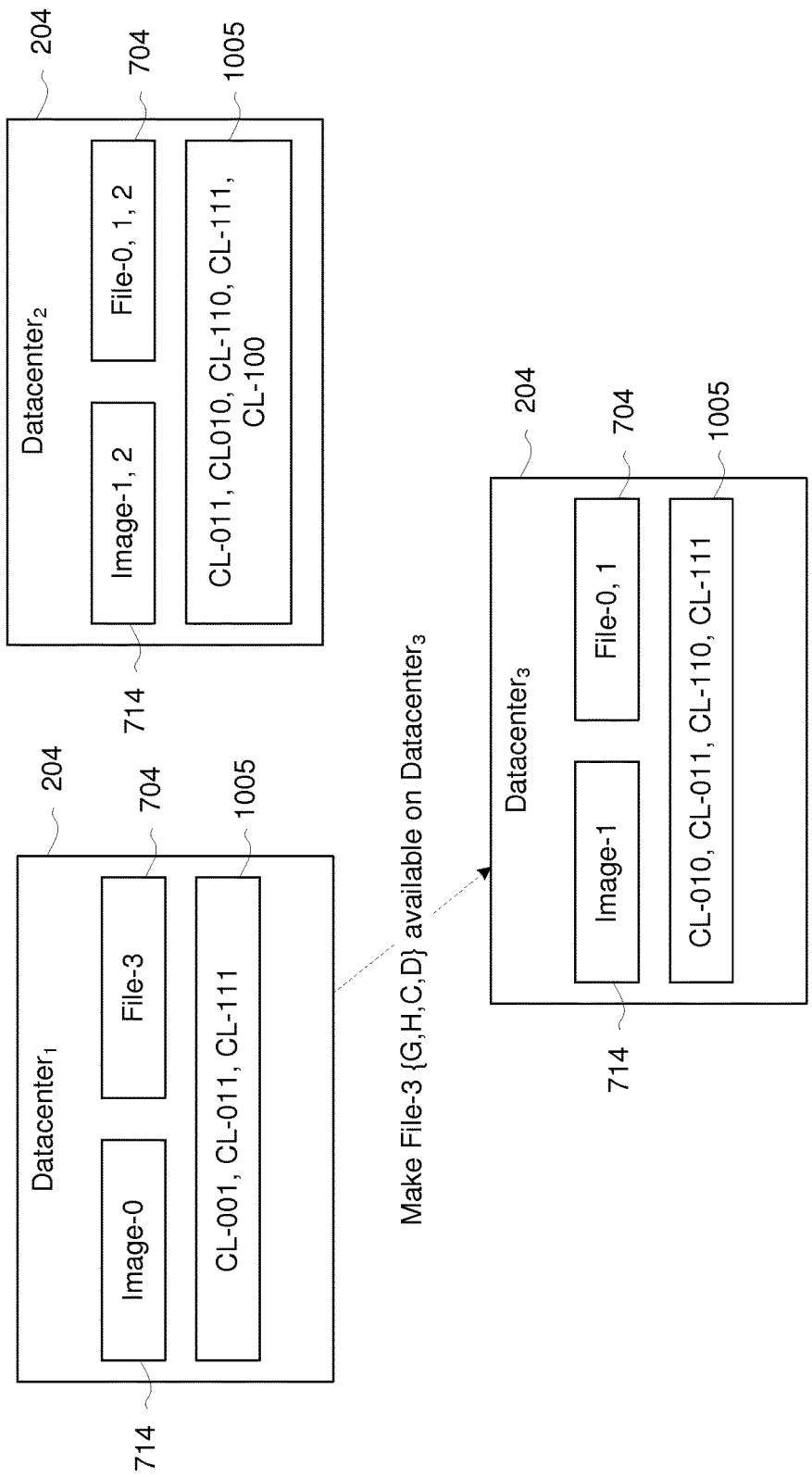
FIGS. 10A-E are block diagrams of illustrative examples of operations of the methods of FIGS. 8 and 9 on the cloud computing environment of FIG. 6 based on the data and metadata of FIGS. 7A-F, according to embodiments of the invention.
Figure 10B:
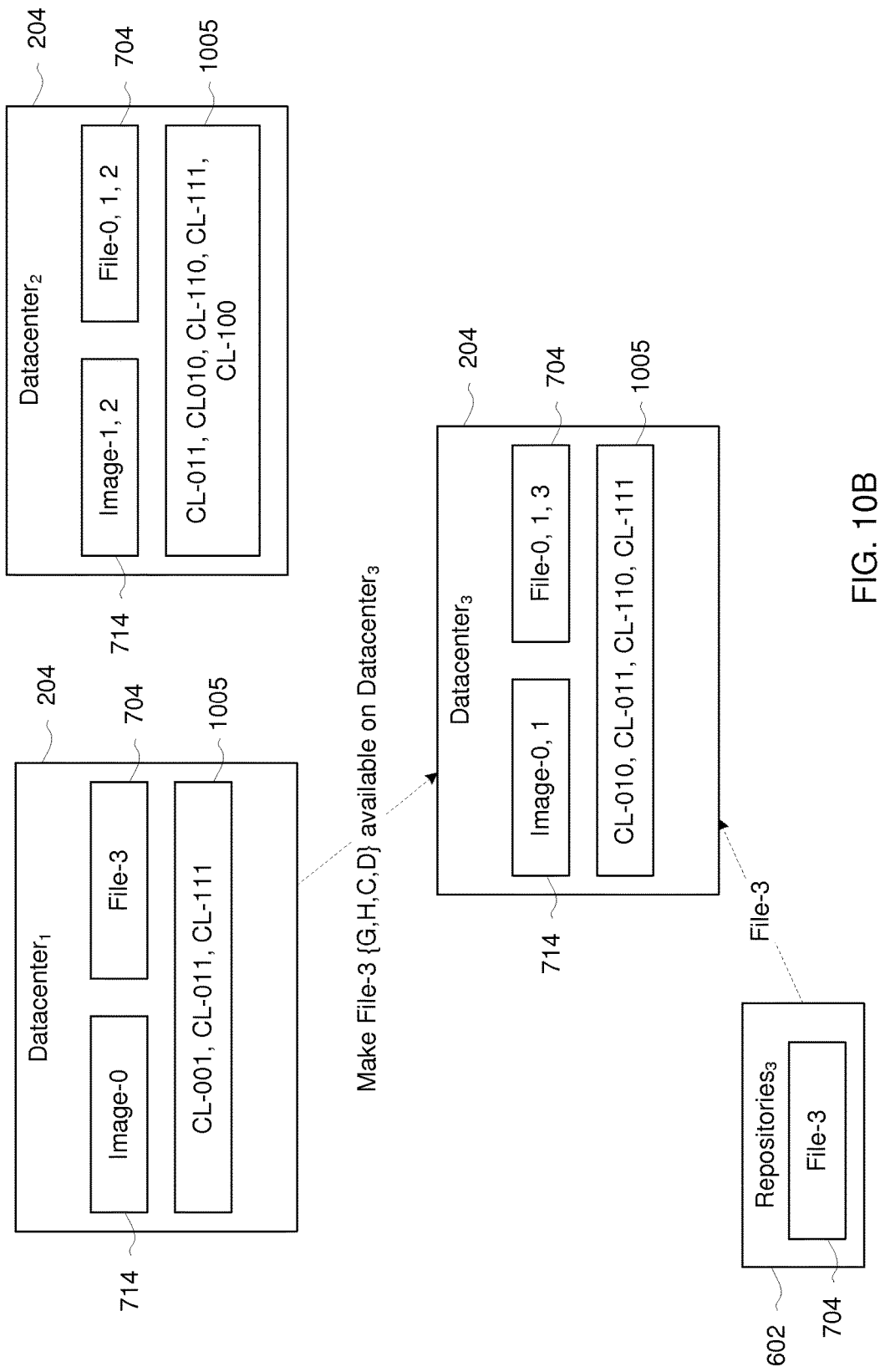
Figure 10C:
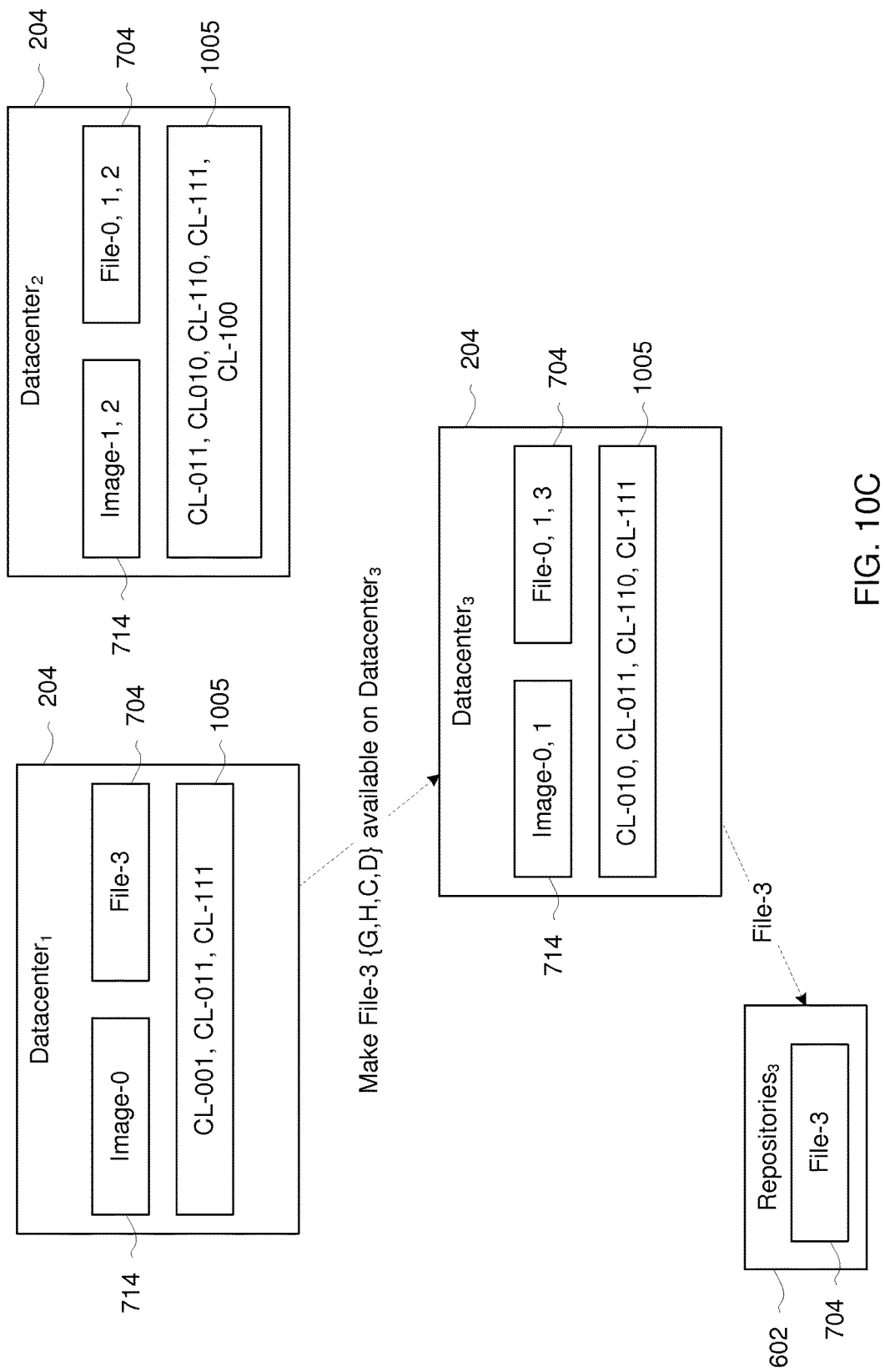

FIGS. 10A-C depict making designated data, which may be stored on a source datacenter, available on a target datacenter in the cloud computing environment 600 of FIG. 6, according to embodiments of the invention. The designated data may include some or all of the data described in connection with FIGS. 7A-C. This may be achieved using, for example, methods 800 (FIG. 8) and 900 (FIG. 9). In FIGS. 10A-C, data on each datacenter 204 may be associated with one or more similarity clusters 1005.

Referring now to FIGS. 6, 7A-C, and 10A, Global Tracker Agent 616 may receive an instruction to make File-3, stored on Datacenter$_1$ and having distinct checksums {G,H,C,D}, available on Datacenter$_3$. In this example, File-3 is the designated data set. Based on Datacenter$_1$ storing Image-0 and File-3, and by consulting the similarity matrix or cluster index that Global Tracker Agent 616 maintains, Global Tracker Agent 616 determines that three clusters CL-001, CL-011, and CL-111 (belonging to Image-0) contain all data blocks necessary to replicate File-3 on Datacenter$_3$. At this stage, CL-001 resides only on Datacenter$_1$, and is part of the first subset of similarity clusters; its only available source is Datacenter$_1$. Therefore, unless CL-001 is also available from a regional repository 602 of Datacenter$_3$, it must be transferred to Datacenter$_3$ from Datacenter$_1$. This may be a costly operation. CL-011 and CL-111 already reside on Datacenter$_3$, and therefore do not require any transfer; in this example, these two clusters are part of the second subset of similarity clusters, described above.

Referring now to FIGS. 6, 7A-C, and 10B, Global Tracker Agent 616 determines, in this example, that CL-001 is available on one of the regional repositories 602 of Datacenter$_3$, i.e., Repositories$_3$. Accordingly, Global Tracker Agent 616 determines that CL-001 (the cluster that requires transferring to Datacenter$_3$) is among the third subset of similarity clusters; it exists on both the source datacenter 204 (Datanceter$_1$) and at least one datacenter 204 or regional repository 602 other than the target datacenter 204 (Datacenter$_3$) and the source datacenter 204. In this example, Global Tracker Agent 616 may determine that the cost, time, bandwidth, and/or a host of other replication rules make Repositories$_3$ a preferred source for transferring CL-001 to Datacenter$_3$. Global Tracker Agent 616 generates a corresponding replication plan.

As a result of the transfer of a data blocks associated with a single transfer, Datacenter$_3$ now has Image-0 (because all constituent data blocks of Image-0 are now present on Datacenter$_3$). Whereas under the prior art, a replication of Image-0 on Datacenter$_3$ would require transferring all associated data blocks of Image-0 {$C_1,C_2,D,G,E,C_3,F,G_2,H$} from Datacenter$_1$ to Datacenter$_3$, the mere transfer of CL-001 from Respositories$_3$ to Datacenter$_3$ has provided Datacenter$_3$ with all necessary constituent data blocks to reconstitute Image-0 if required, including all duplicate data blocks, without having transferred all of them.

Referring now to FIGS. 6, 7A-C, and 10C, Global Tracker Agent 616 attempts to transfer File-3 to Respositories$_3$. However, in this example, it is assumed that Datacenter$_3$ does not store File-3 as a stand-alone file. In other words, while distinct data blocks of File-3 exist on Datacenter$_3$, File-3 does not exist in reconstituted form. Under the prior art, this would present a major challenge, because making File-3 available on Repositories$_3$ would require one or more costly transfers of the entirety of File-3, including duplicate data blocks, through one or more datacenters 204. However, since Datacenter$_3$ already includes Image-0, together with all its other data blocks as indicated by its clusters, Datacenter$_3$ has all data blocks necessary to reconstitute File-3 on Repositories$_3$.

Figure 10D:
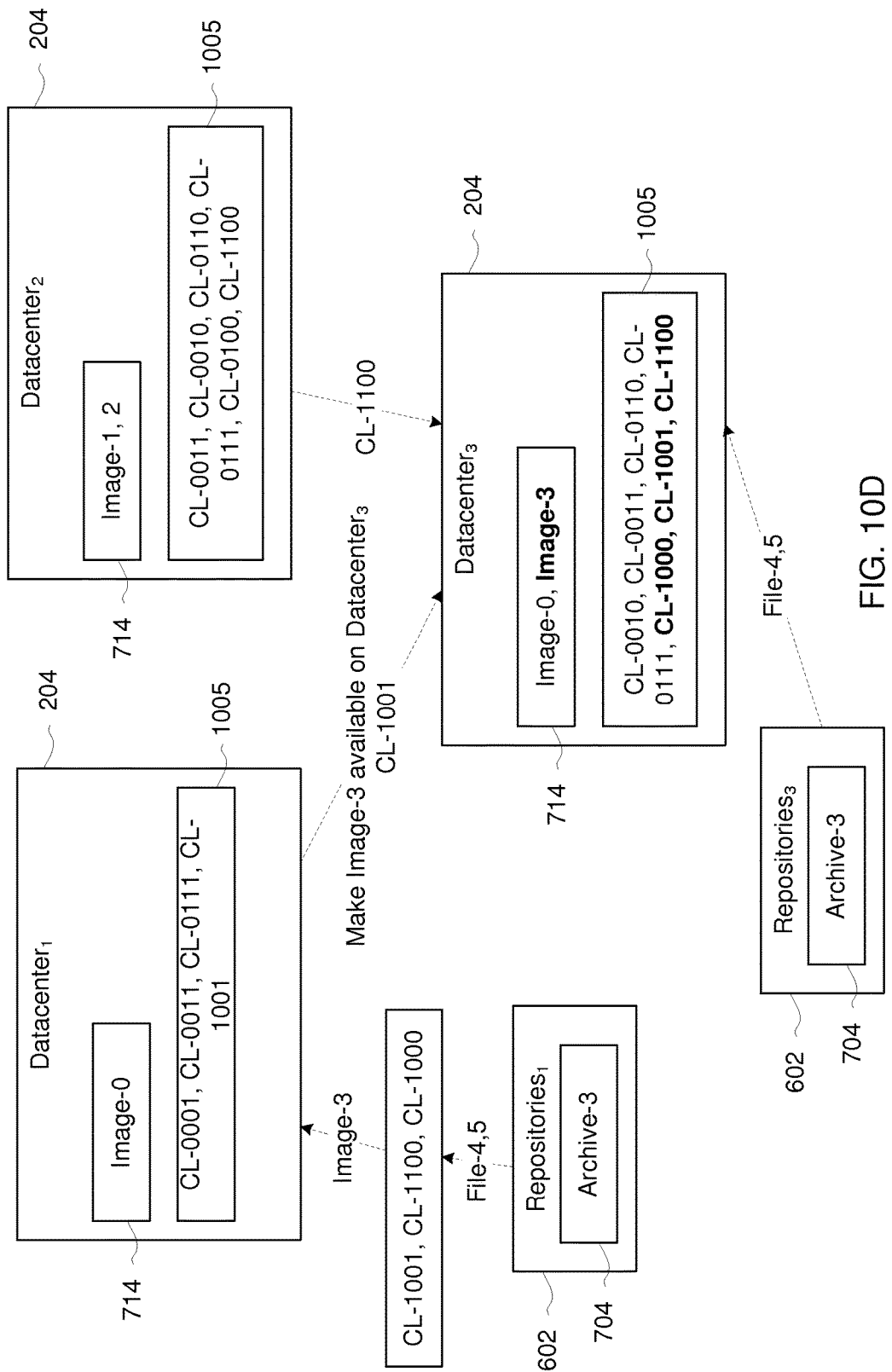
Figure 10E:
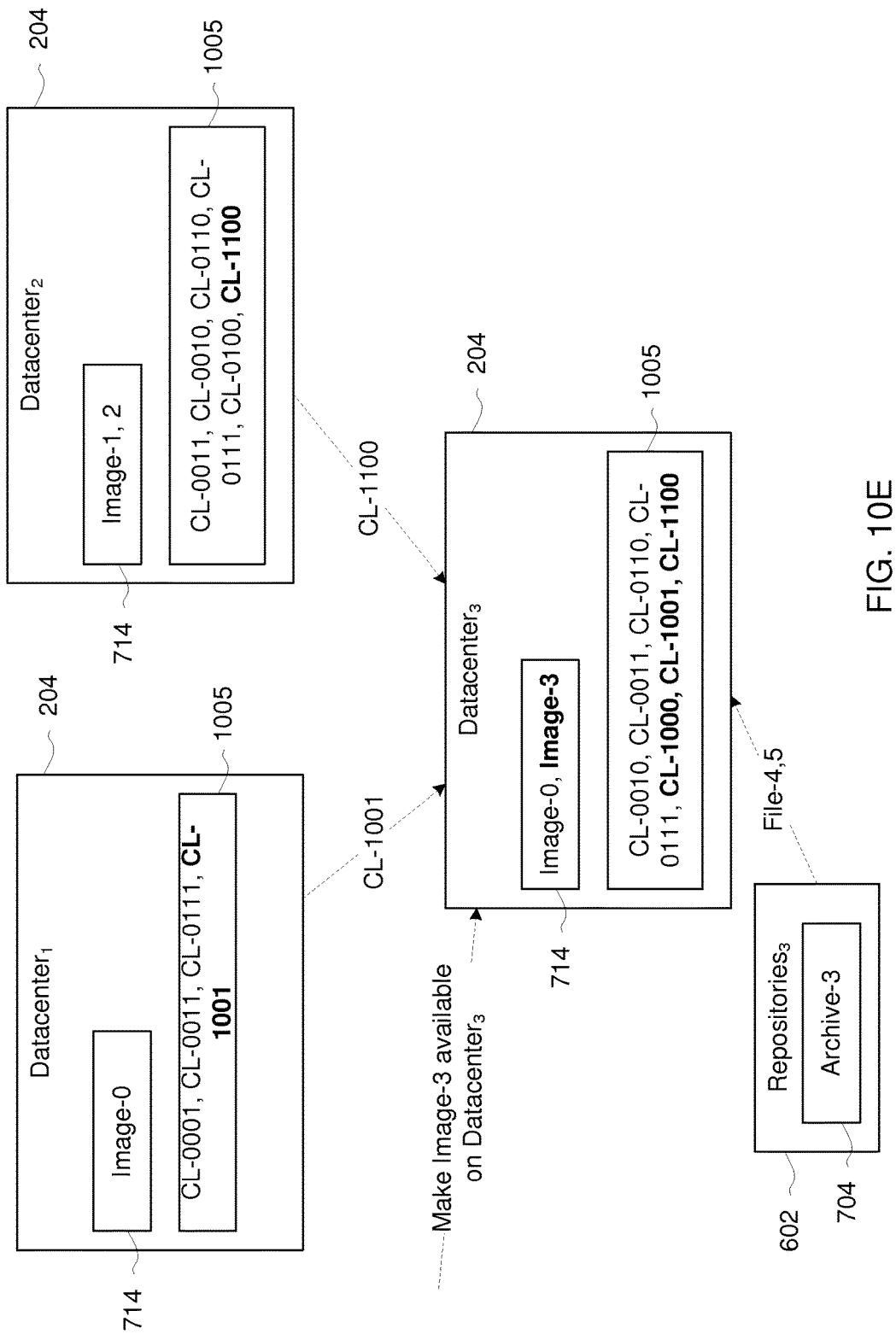

FIG. 10D depicts making designated data stored on a source datacenter available on a target datacenter in the cloud computing environment 600 of FIG. 6, according to embodiments of the invention. The designated data may include some or all of the data described in connection with FIGS. 7D-F. This may be achieved using, for example, methods 800 (FIG. 8) and 900 (FIG. 9). In FIG. 10D, data on each datacenter 204 may be associated with one or more similarity clusters 1005.

Referring now to FIGS. 6, 7D-F, and 10D, Global Tracker Agent 616 attempts to make a VM image 714 available on a target datacenter 204 from multiple source datacenters 204 and repositories 602. For example, a user may create Image-3 (FIG. 7E) on Datacenter$_1$ such that CL-1001, CL-1100, and CL-1000 are made available on Datacenter$_1$. The user may use Repository) for creating the image. Thereafter, an instruction may be generated to make Image-3 available on Datacenter$_3$.

In response to the instruction, archived files 706 (Files-4 and 5) may be copied from Repository$_3$ to Datacenter$_3$ such that CL-1000 is available on Datacenter$_3$.

Thereafter, CL-1001 (already part of Image-0) may be transferred from Datacenter$_1$ and CL-1100 (already part of Image-1 and Image-3) may be copied from Datacenter$_1$ or Datacenter$_2$ to Datacenter$_3$.

As a result, CL-1000, CL-1001, and CL-1100, are transferred to Datacenter$_3$ using multiple datacenters 204 and regional repositories 602.

Referring to FIGS. 6, 7D-F, and 10E, Image-3 might have been deleted from all datacenters and there might be a requirement to make Image-3 available on Datacenter$_3$. Under the prior art, a crude transfer method may include transferring Image-3 from an external source. In the present example, no datacenter 204 has a copy of Image-3, making the replication impossible under conventional methods. However, according to embodiments of the invention, Image-3 may be created using, for example, archived files 706 (including Files-4 and 5) from, for example, Repository$_3$, to generate CL-1000. CL-1100 is copied from Datacenter$_2$ to Datacenter$_3$ and CL-1001 copied from Datacenter$_2$ to Datacenter$_3$.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
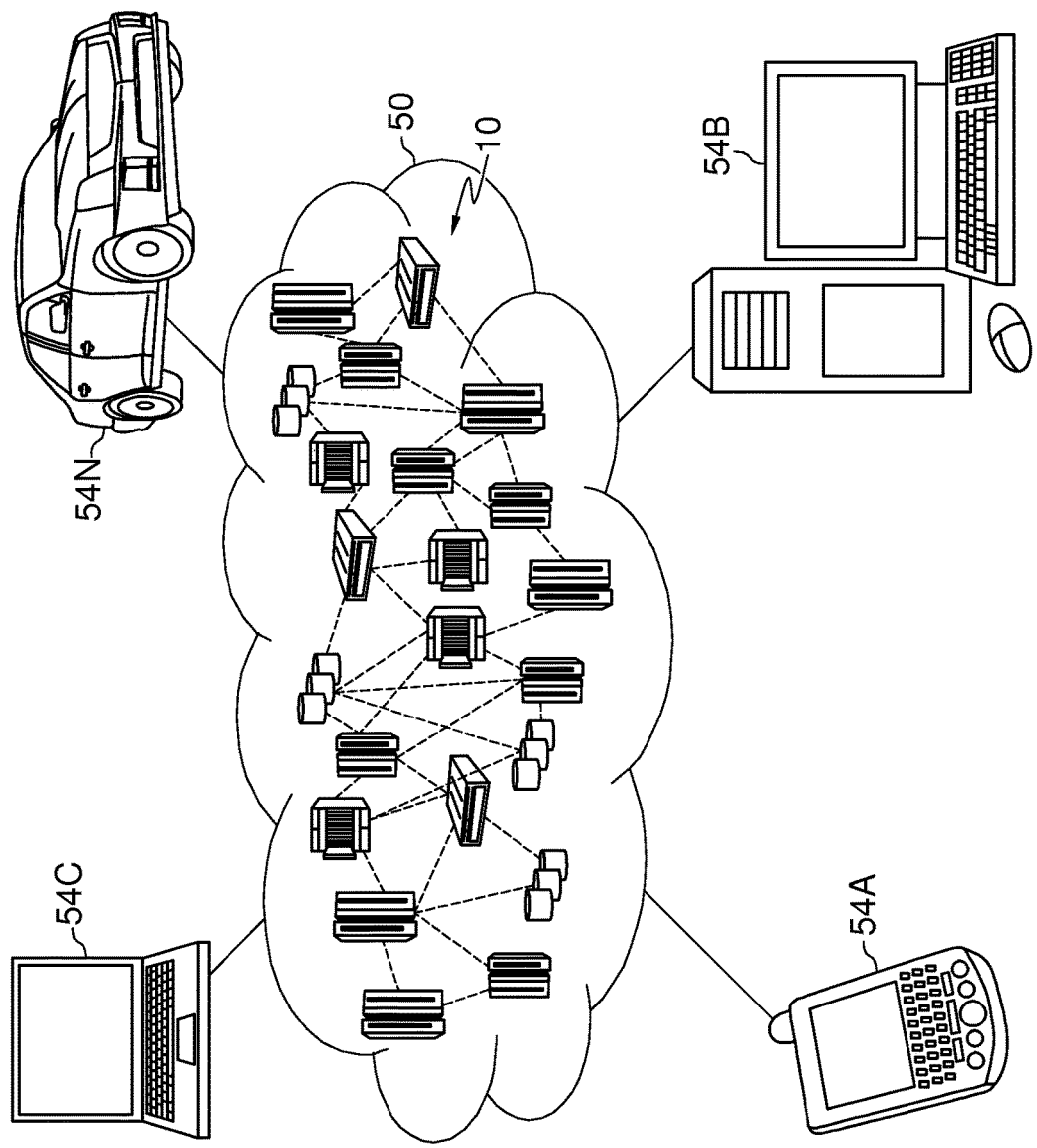
FIG. 12 is a block diagram of an illustrative cloud computing environment, according to an aspect of the invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that cloud computing nodes 10 and cloud computing environment 50 can communicate with any type of computerized device over any type of network and/or network addressable connection (e.g., using a web browser).

Figure 13:
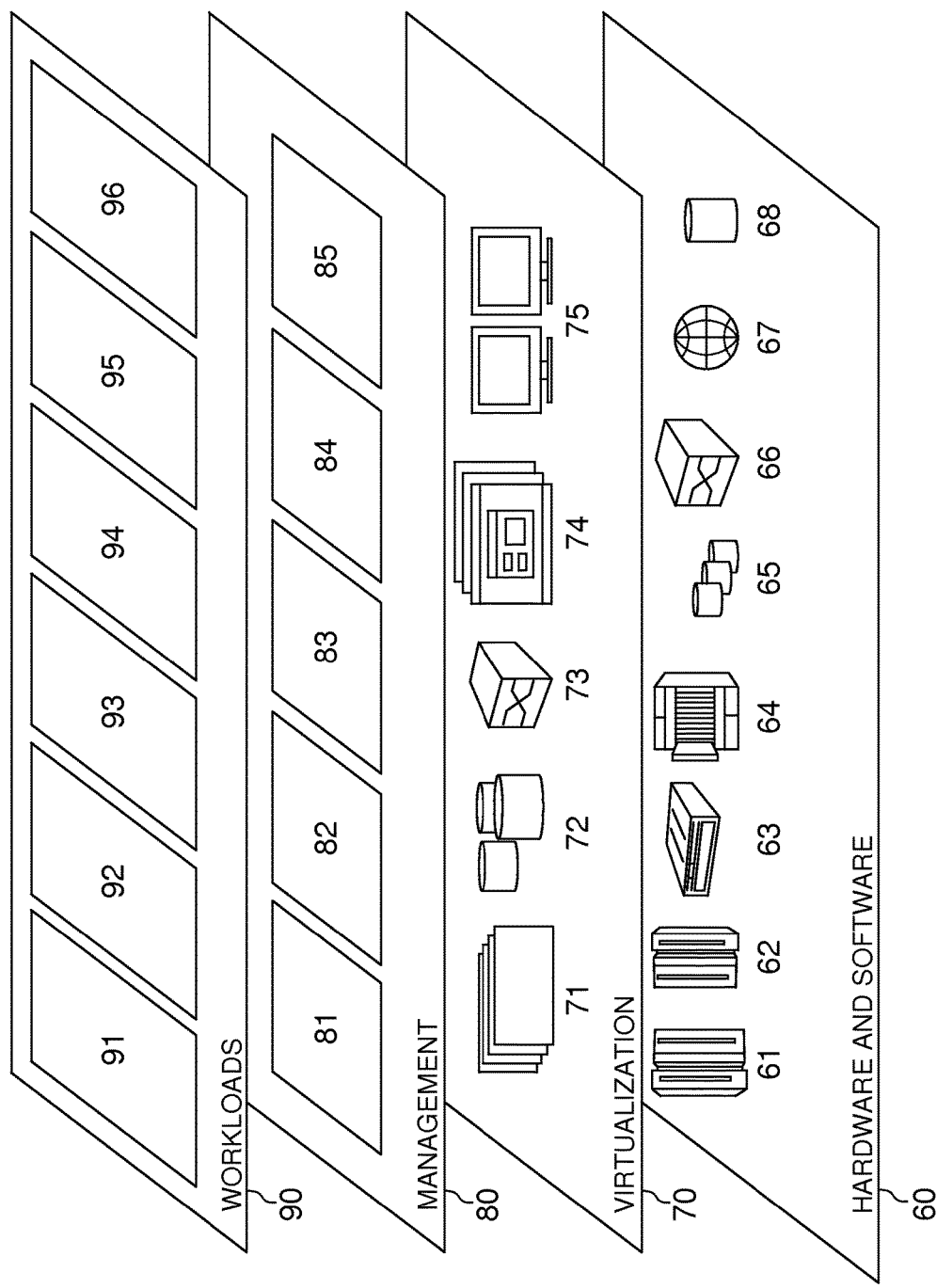
FIG. 13 is a block diagram of functional layers of the illustrative cloud computing environment of FIG. 12, according to an aspect of the invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; data transfer functions 96, including those described in connection with FIGS. 1-10D. In a related embodiment, data transfer functions 96 may be provided as part of hardware and software layer 60, virtualization layer 70, or management layer 80, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing data on a plurality of servers, comprising:
   identifying one or more attributes of the plurality of servers;
   identifying shared attributes of the plurality of servers based on the identified attributes;
   assigning the plurality of servers to one or more server groups based on corresponding shared attributes of the plurality of servers, whereby each grouping of a set of servers among the plurality of servers defines a region, the region is associated with a datacenter, the datacenter includes an agent for tracking information of a local image library, wherein the local image library comprises a collection of images that are transferred by the agent between the plurality of servers; and
   replicating a virtual machine image onto a target server of the plurality of servers, wherein the virtual machine image comprises a plurality of data blocks, and wherein replicating the virtual machine image comprises:
      determining a first source image from a plurality of virtual machine images on the plurality of servers, wherein the first source virtual machine image comprises a first plurality of data blocks, wherein the first plurality of data blocks has a similarity index with respect to the virtual machine image is above a threshold value, and wherein the similarity index indicates that the first source virtual machine image is not identical to the virtual machine image;
      determining a first set of one or more data blocks of the virtual machine image contained in the first source image that match the virtual machine image;
      transferring the first set of one or more data blocks from the other server to the target server;
      determining a second set of one or more data blocks of the virtual machine image contained in other servers of the plurality of servers, wherein the second set of one or more data blocks does not contain any data blocks from the first set of the one or more data blocks; and
      transferring the second set of one or more data blocks from the other server to the target server.

2. The method of claim 1, wherein the one or more attributes comprise at least one of:
   a geographical region;
   a geographical proximity relative to one or more servers;
   a cost factor;
   an accessibility factor; and
   server bandwidth.

3. The method of claim 1, wherein the plurality of servers comprise one or more of a file transfer protocol (FTP) server, a hyper text transfer protocol (HTTP) server, and the datacenter.

4. The method of claim 1, wherein data stored on the plurality of servers comprises a software package.

5. The method of claim 4, wherein the software package is in archived format.

6. The method of claim 4, wherein data blocks of the software package are distributed among at least two of the plurality of servers, whereby none of the plurality of servers store all data blocks of the software package.

7. The method of claim 1, further comprising:
   receiving an instruction to replicate a designated data set having data blocks stored on one or more of the plurality of servers on a target server; and
   selecting one of the one or more servers as a source server, wherein the selecting is based on one or more of:
      the source server belonging to a same region as the target server;
      the source server belonging to a region having a defined minimum bandwidth available;
      the source server being the datacenter; and
      the source server having a trust factor meeting a threshold value, wherein the trust factor.

8. A computer system for managing data on a plurality of servers, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
   identifying one or more attributes of the plurality of servers;
   identifying shared attributes of the plurality of servers based on the identified attributes;
   assigning the plurality of servers to one or more server groups based on corresponding shared attributes of the plurality of servers, whereby each grouping of a set of servers among the plurality of servers defines a region, the region is associated with a datacenter, the datacenter includes an agent for tracking information of a local image library, wherein the local image library comprises a collection of images that are transferred by the agent between the plurality of servers; and replicating a virtual machine image onto a target server of the plurality of servers, wherein the virtual machine image comprises a plurality of data blocks, and wherein replicating the virtual machine image comprises:
  determining a first source image from a plurality of virtual machine images on the plurality of servers, wherein the first source virtual machine image comprises a first plurality of data blocks, wherein the first plurality of data blocks has a similarity index with respect to the virtual machine image is above a threshold value, and wherein the similarity index indicates that the first source virtual machine image is not identical to the virtual machine image;
  determining a first set of one or more data blocks of the virtual machine image contained in the first source image that match the virtual machine image;
  transferring the first set of one or more data blocks from the other server to the target server;
  determining a second set of one or more data blocks of the virtual machine image contained in other servers of the plurality of servers; and
  transferring the second set of one or more data blocks from the other server to the target server.

9. The system of claim 8, wherein the one or more attributes comprise at least one of:
  a geographical region;
  a geographical proximity relative to one or more servers;
  a cost factor;
  an accessibility factor; and
  server bandwidth.

10. The system of claim 8, wherein the plurality of servers comprise one or more of a file transfer protocol (FTP) server, a hyper text transfer protocol (HTTP) server, and the datacenter.

11. The system of claim 8, wherein data stored on the plurality of servers comprises a software package, and wherein data blocks of the software package are distributed among at least two of the plurality of servers, whereby none of the plurality of servers store all data blocks of the software package.

12. The system of claim 8, wherein the program instructions further comprise instructions for:
  receiving an instruction to replicate a designated data set having data blocks stored on one or more of the plurality of servers on a target server; and
  selecting one of the one or more servers as a source server, wherein the selecting is based on one or more of:
    the source server belonging to a same region as the target server;
    the source server belonging to a region having a defined minimum bandwidth available;
    the source server being the datacenter; and
    the source server having a trust factor meeting a threshold value, wherein the trust factor.

13. A computer program product for managing data on a plurality of servers, comprising a non-transitory tangible storage device having program code embodied therewith, the program code executable by a processor of a computer to perform a method, the method comprising:
  identifying one or more attributes of the plurality of servers, by the processor;
  identifying shared attributes of the plurality of servers, by the processor, based on the identified attributes; and
  assigning the plurality of servers, by the processor, to one or more server groups based on corresponding shared attributes of the plurality of servers, whereby each grouping of a set of servers among the plurality of servers defines a region, the region is associated with a datacenter, the datacenter includes an agent for tracking information of a local image library, wherein the local image library comprises a collection of images that are transferred by the agent between the plurality of servers; and
  replicating a virtual machine image onto a target server of the plurality of servers, wherein the virtual machine image comprises a plurality of data blocks, and wherein replicating the virtual machine image comprises:
    determining a first source image from a plurality of virtual machine images on the plurality of servers, wherein the first source virtual machine image comprises a first plurality of data blocks, wherein the first plurality of data blocks has a similarity index with respect to the virtual machine image is above a threshold value, and wherein the similarity index indicates that the first source virtual machine image is not identical to the virtual machine image;
    determining a first set of one or more data blocks of the virtual machine image contained in the first source image that match the virtual machine image;
    transferring the first set of one or more data blocks from the other server to the target server;
    determining a second set of one or more data blocks of the virtual machine image contained in other servers of the plurality of servers; and
    transferring the second set of one or more data blocks from the other server to the target server.

14. The computer program product of claim 13, wherein the method further comprises:
  receiving an instruction to replicate a designated data set having data blocks stored on one or more of the plurality of servers on a target server; and
  selecting one of the one or more servers as a source server, wherein the selecting is based on one or more of:
    the source server belonging to a same region as the target server;
    the source server belonging to a region having a defined minimum bandwidth available;
    the source server being the datacenter; and
    the source server having a trust factor meeting a threshold value, wherein the trust factor.

* * * * *